United States Patent
Juels et al.

(10) Patent No.: US 9,008,303 B1
(45) Date of Patent: Apr. 14, 2015

(54) METHOD AND APPARATUS FOR GENERATING FORWARD SECURE PSEUDORANDOM NUMBERS

(75) Inventors: Ari Juels, Brookline, MA (US); Nikolaos Triandopoulos, Arlington, MA (US); Kevin Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 718 days.

(21) Appl. No.: 13/334,709

(22) Filed: Dec. 22, 2011

(51) Int. Cl.
*H04L 9/00* (2006.01)
*H04L 9/08* (2006.01)
*G06F 7/58* (2006.01)

(52) U.S. Cl.
CPC ........... *H04L 9/0869* (2013.01); *H04L 2209/38* (2013.01); *H04L 9/0891* (2013.01); *G06F 7/582* (2013.01)

(58) Field of Classification Search
CPC ................ G06F 21/60; G06F 21/602; G06F 7/58–7/586; H04L 9/00; H04L 9/006; H04L 9/06; H04L 9/0618; H04L 9/0643; H04L 9/0693; H04L 9/08; H04L 9/0816; H04L 9/0838; H04L 9/0861; H04L 9/0869; H04L 9/0891; H04L 9/28; H04L 2209/38
USPC ...................... 380/44, 46; 708/250, 252, 254; 707/797, 799, 800
See application file for complete search history.

(56) References Cited

U.S. PATENT DOCUMENTS 7,095,850 B1 * 8/2006 McGrew .......................... 380/42
7,562,221 B2 * 7/2009 Nystrom et al. .............. 713/168

(Continued)

OTHER PUBLICATIONS

Bellare et al., A Forward-Secure Digital Signature Scheme, in CT-RSA '03: Proceedings of the 2003 RSA conference on the cryptographers' track, pp. 1-18, Berlin, Heidelberg, 2003. Spring-Verlag.

(Continued)

*Primary Examiner* — Saleh Najjar
*Assistant Examiner* — Eric W Shepperd
(74) *Attorney, Agent, or Firm* — Ryan, Mason & Lewis, LLP

(57) ABSTRACT

Methods and apparatus are provided for generation of forward secure pseudorandom numbers. A forward secure pseudorandom number is generated by obtaining a first state $s_i$ corresponding to a current leaf node $v_i$ in a hierarchical tree, wherein the current leaf $v_i$ produces a first pseudorandom number $r_{i-t}$ and wherein the hierarchical tree comprises at least one chain comprised of a plurality of nodes on a given level of the hierarchical tree; updating the first state $s_i$ to a second state $s_{i+t}$ corresponding to a second leaf node $v_{i+t}$; and computing a second pseudorandom number $r_{i+t-1}$ corresponding to the second leaf node $v_{i+t}$. The variable t may be an integer greater than one. Updating the state does not require generation of all pseudorandom numbers produced by leaf nodes between the current leaf node $v_i$ and the second leaf node $v_{i+t}$.

46 Claims, 12 Drawing Sheets

(56) References Cited

U.S. PATENT DOCUMENTS

| | | | |
|---|---|---|---|
| 7,941,666 B2* | 5/2011 | Kocher | 713/172 |
| 2003/0086565 A1* | 5/2003 | Desai et al. | 380/45 |
| 2007/0230694 A1* | 10/2007 | Rose et al. | 380/46 |
| 2008/0085005 A1* | 4/2008 | Jung et al. | 380/282 |
| 2009/0106338 A1* | 4/2009 | Dunbar | 708/251 |
| 2010/0058077 A1* | 3/2010 | Matsuda et al. | 713/194 |
| 2010/0077201 A1* | 3/2010 | Asano et al. | 713/150 |
| 2010/0272256 A1* | 10/2010 | Baras et al. | 380/46 |

OTHER PUBLICATIONS

Canetti et al., Proactive Security: Long-Term Protection Against Break-Ins. RSA CryptoBytes, 3(1):1-9, 1997.

Groza, Broadcast Authentication with Practically Unbounded One-Way Chains. Journal of Software, 3(3):11-20, 2008.

Hastad et al., A Pseudorandom Generator from Any One-Way Function. SIAM J. Comput., 28(4):1364-1396, 1999.

Itkis, Handbook of Information Security, chapter Forward Security: Adaptive Cryptography—Time Evolution. John Wiley and Sons, pp. 1-27, 2006.

Krawczyk, Simple Forward-Secure Signatures from Any Signature Scheme, in ACM Conference on Computer and Communications Security, pp. 108-115, 2000.

* cited by examiner

Algorithm Next($s_i$, t)
1. if $i = 0$ then $N \leftarrow [s_0, 0, 1, n]$ and $Q.\text{push}(N)$;
2. $N \leftarrow \text{getNextLeafSeed}(t)$;
3. $r_{i+t-1} \leftarrow h(N.\text{seed})$;
4. delete($N$);
5. return $r_{i+t-1}$;

Procedure $N \leftarrow \text{getNextLeafSeed}(t)$
1. $dist \leftarrow t$;
2. while $dist > 0$
   (a) $N \leftarrow Q.\text{pop}()$;
   (b) if $dist > N.\text{cap}$ then
      i. $dist \leftarrow dist - N.\text{cap}$;
   else
      i. $dist \leftarrow \text{expand}(N, dist)$;
      ii. if $dist = 0$ then return $N$;
   (c) delete($N$);

Procedure $dist \leftarrow \text{expand}(N, dist)$
1. if $N.pp < k_{N.\text{level}}$ then
   (a) $M \leftarrow [f(N.\text{seed}), N.\text{level}, N.pp + 1, N.\text{cap} - w(N.\text{level})]$;
   (b) $Q.\text{push}(M)$;
2. if $[(N.\text{level} = d \text{ and } dist = 1) \text{ or } w(N.\text{level}) < dist]$ then return $dist - w(N.\text{level})$;
3. $j = 1$;
4. while $(dist > w(N.\text{level} + 1))$
   (a) $dist \leftarrow dist - w(N.\text{level} + 1)$;
   (b) $j \leftarrow j + 1$;
5. for $i = \ell_{N.\text{level}+1}$ down to $j$
   (a) $M \leftarrow [g(N.\text{seed}\|i\|N.\text{level}), N.\text{level} + 1, 1, w(N.\text{level} + 1)]$;
   (b) $Q.\text{push}(M)$;
6. return $dist$;

METHOD AND APPARATUS FOR GENERATING FORWARD SECURE PSEUDORANDOM NUMBERS

FIELD OF THE INVENTION

The present invention relates generally to techniques for generating pseudorandom numbers.

BACKGROUND

The security of cryptographic constructions relies on some secret information to which should be accessible by honest parties and legitimate users, but which should not be accessible by malicious parties or non-legitimate users. Accordingly, the security properties of any computing system that makes use of cryptographic constructions hold under the assumption that certain secret information (typically, comprising one or more secret keys) is and remains unknown by any attacker against the system.

In general, the security of any such system is immediately compromised once this secret information, referred to as secret state, is exposed (in public or to an attacker against the system). For instance, the secret state can simply comprise one secret key and if this key leaks to an attacker, then both the underlying cryptographic construction and the higher-application system become vulnerable to trivial attacks. This fatal exposure of the secret information is a serious real-life problem: secret keys may be lost accidentally or erroneously due to human mistakes or due to incorrect key-management practices, or they may be stolen as a result of sophisticated attacks against the system. Therefore, it is important to apply additional security mechanisms that protect against such secret-state exposures.

Forward security refers to a cryptographic property according to which an exposed secret key can affect the security of the underlying system only in the future but not in the past. Forward security is implemented in practice through systematic pseudorandom key updates, so that the usage of older keys in the past remains secure indefinitely in the future, despite any possible compromises of newer keys that may occur in the future. However, this key-update procedure introduces additional computational and storage overheads in the system, especially for applications where keys must be updated asynchronously or on demand, i.e., a new key that is "distant" from the current key must be produced, thus the key-update procedure must operate in a "jump-ahead" fashion.

A need exists for forward-secure pseudorandom generators (FS-PRNGs) that are forward secure as well as efficient with respect to their key-update processes. In other words, a need remains for FS-PRNG schemes that incur low catch-up costs while keeping the required storage small possible. A further need remains for FS-PRNG schemes that are as general as possible, thus covering a wide range of possible applications, and that can support additional security practices.

SUMMARY OF THE INVENTION

The present invention in the illustrative embodiments described herein provides methods and apparatus for generation of forward secure pseudorandom numbers. According to one aspect of the invention, a forward secure pseudorandom number is generated by obtaining a first state $s_i$ corresponding to a current leaf node $v_i$ in a hierarchical tree, wherein the current leaf $v_i$ produces a first pseudorandom number $r_{i-1}$ and wherein the hierarchical tree comprises at least one chain comprised of a plurality of nodes on a given level of the hierarchical tree; updating the first state $s_i$ to a second state $s_{i+t}$ corresponding to a second leaf node $v_{i+t}$; and computing a second pseudorandom number $r_{i+t-1}$ corresponding to the second leaf node $v_{i+t}$. The variable t may be an integer greater than one. According to a further aspect of the invention, updating the state does not require generation of all pseudorandom numbers produced by leaf nodes between the current leaf node $v_i$ and the second leaf node $v_{i+t}$.

The disclosed exemplary techniques for generating forward secure pseudorandom numbers overcome one or more of the problems associated with the conventional techniques described previously. Moreover, no modification of the applications or communication protocols is required. These and other features and advantages of the present invention will become more readily apparent from the accompanying drawings and the following detailed description.

BRIEF DESCRIPTION OF THE DRAWINGS

FIG. 11 illustrates pseudocode for an exemplary implementation of algorithm Next;

FIG. 12 illustrates pseudocode for an exemplary implementation of helper procedure getNextLeafSeed( ) used by the algorithm of FIG. 11;

FIG. 13 illustrates pseudocode for an exemplary implementation of helper procedure expand( ) used by the algorithm of FIG. 11;

DETAILED DESCRIPTION

The present invention provides improved techniques for generating forward secure pseudorandom numbers. According to one aspect of the invention, pseudorandom keys are updated in a forward-secure way. A generalized forward-secure pseudorandom generator (FS-PRNG) scheme is provided that allows for both synchronous and asynchronous key updates and at the same incurs low storage cost. The disclosed construction supports event-driven and time-driven key updates and it can be instantiated to derive a large variety of concrete key-update procedures that can better meet the end-application needs.

Figure 1:
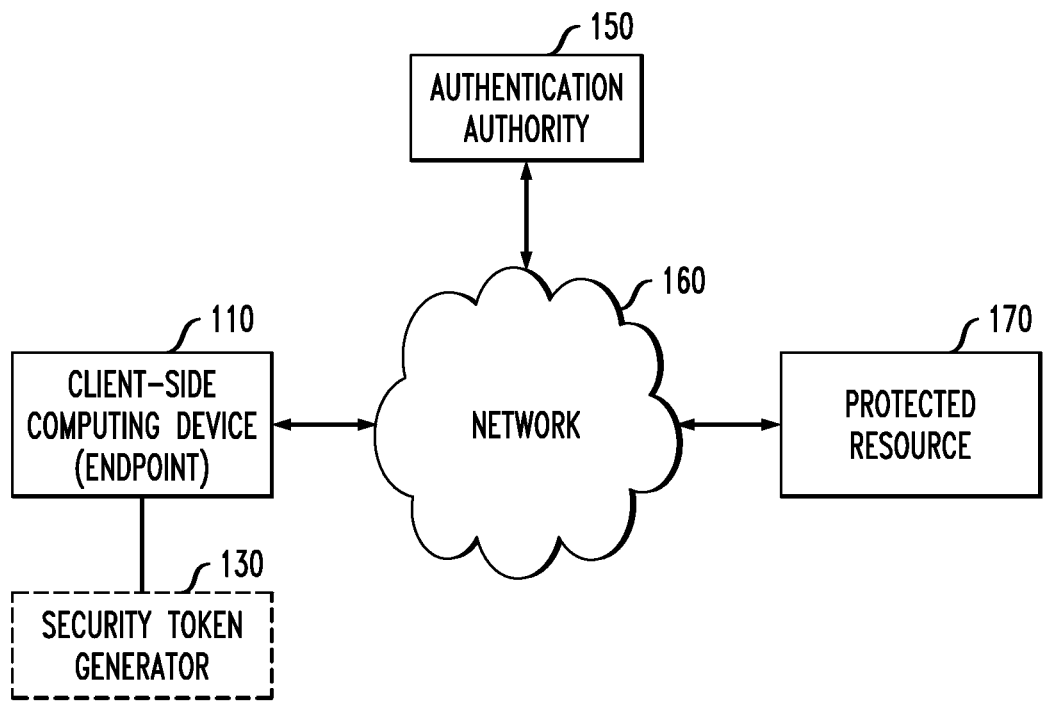
FIG. 1 illustrates an exemplary network environment in which the present invention can operate.

FIG. 1 illustrates an exemplary network environment in which a Secure Client-Server Communications application of the present invention can operate. As shown in FIG. 1, an exemplary client-side computing device (CSCD) 110 communicates with a protected resource 170 over a network 160.

In an exemplary implementation, the user must authenticate with an authentication authority 150 using a passcode generated by a security passcode-generator token 130 (hereinafter, referred to as security token 130) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

The user of the CSCD 110 is authenticated with the protected resource 170 using a variable key that may be generated in accordance with the present invention. It is to be appreciated that a given embodiment of the disclosed system may include multiple instances of CSCD 110, security token 130, authentication authority 150 and protected resource 170, and possibly other system components, although only single instances of such components are shown in the simplified system diagram of FIG. 1 for clarity of illustration.

The security token 130 is shown in FIG. 1 as being separate from and electrically connected to the CSCD 110. The security token 130 may be implemented, for example, using the RSA SecurID® user authentication token commercially available from RSA Security Inc. of Bedford, Mass., U.S.A. The security token 130 may be a server or other type of module that is accessible over the network 150, or it may be a software component resident on the CSCD 110. As another alternative, token 130 may be distributed over multiple devices, one of which may be the CSCD 110. Thus, while the present invention is illustrated herein using a security token 130 electrically connected to the CSCD 110, such that the CSCD 110 can read a given passcode (or another authentication value) directly from the token 130, other implementations are within the scope of the present invention, as would be apparent to a person of ordinary skill in the art. For example, for other security tokens 130 that are not connectable to a computer or other user device in this manner, the user may manually enter a password or another value displayed by the token 130 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention. The CSCD 110 may also be referred to herein as simply a "user." The term "user" should be understood to encompass, by way of example and without limitation, a user device, a person utilizing or otherwise associated with the device, or a combination of both. A password or other authentication information described as being associated with a user may, for example, be associated with a CSCD device 110, a person utilizing or otherwise associated with the device, or a combination of both the person and the device.

The authentication authority 150 is typically a third party entity that processes authentication requests on behalf of web servers and other resources, and verifies the authentication information that is presented by a CSCD 110.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Forward Security Through Key Updates

With forward security, the secret state is not partitioned into any pieces, but it now evolves over time: the current secret state is deleted and replaced by a new secret state, and this process continues periodically or on demand for the entire lifetime of the system. The offered security property is immediate: if a secret state is (securely) erased by the system, then it cannot be stolen or leaked. Therefore, such frequent updates in the secret state amplify the security of the system because old secret states cannot be stolen or leaked, and thus remain information-theoretically secure indefinitely in the future.

However, for efficiency purposes, the new produced secret state typically depends on the current state. For instance, if a public-key cryptographic construction is used by the system, then it is desired that the current secret key can be replaced by a new secret key so that both secret keys correspond to the same public key (i.e., the public key should not be updated), and in this case the new secret key depends on (e.g., is derived by) the current secret key. In this case, forward security enforces an important additional property according to which any dependencies among the secret states are cryptographically protected in the backward direction: the new secret state is derived by the current state in a one-way fashion, so that the former does not compromise the latter and, therefore, a given state does not compromise any of the older states. In other words, once replaced (and erased by the system) a secret state remains secure in the forward direction, i.e., any replaced secret state is cryptographically protected, and infeasible to compromise, indefinitely in the future.

Overall, forward security is an important property since it becomes extremely useful in many applications where the security of the system must not be fully compromised should the current secret key be leaked. For instance, under the pessimistic but realistic assumption that a system is more likely to be attacked and compromised in the course of its operational lifetime, forward security can be considered the best-response solution: one can make sure that when this system compromise occurs, then the security of the underlying system is affected only in the future but not in the past. That is, one has to stop using the system but all past usages of the system still remain secure: for instance, if the secret key of a forward-secure signature scheme is exposed, then the corresponding public key must be revoked as being insecure, but all signed messages under past secret keys remain secure.

As we mentioned above, forward security is implemented through systematic key updates in the system, where a new key replaces the current one, so that the usage of older keys in the past remains secure indefinitely in the future despite any possible compromises of newer keys that may occur in the future.

Efficient Forward-Secure Key Updates

The process that implements the update of the secret state lies at the core of any forward-secure cryptographic construction: Given the current state, or key, this process derives a new state, or key, that replaces an old one which is permanently erased from the system. For simplicity, the following discussion refers to keys, rather than states, and this process is referred to as the key-update process.

The key-update process controls the way secret keys evolve over time in a forward-secure way. Depending on the setting, whether the underlying cryptographic construction operates in the public-key or secret-key setting, the process may run by different parties and may require additional properties.

In the public-key setting, there is a public key that the evolving secret keys must be paired with and the public key typically remains the same over time. In this case, the process must ensure that the new secret keys are all consistent with the existing public key, and it is typically run by only one party, e.g., the signer in a forward-secure signature scheme case. In the secret key setting, there is more flexibility in the generation of the new keys, but the process is typically run by two parties, a sender/client and a receiver/server, e.g., for forward-secure communications between two parties. Although the disclosed scheme may be useful in both settings, the exemplary embodiment focuses on forward security in the secret-key setting.

Two different types of key-update processes can be established, based on the frequency and the pattern under which key updates are performed. An event-driven key-update process performs a key update whenever some well-defined event occurs (e.g., an external signal is triggered or updates occur according to an associated heart beat or counter). A time-driven key-update process performs a key update in a pattern that deterministically depends on the current time in the system, in the simplest case with some fixed, predefined period. The disclosed construction operates in either of the two settings.

Two different types of key-update processes can be established, based on the temporal position of the performed key updates. A synchronous key-update process generates keys sequentially, one after the other and is run by two parties in a synchronous (or near-synchronous) fashion. That is, consider an event- or time-driven forward-secure communication between a client and a server; both the client and the server update their shared secret key whenever it is required to compete the next key.

An asynchronous or on-demand key-update process may generate keys on-demand, not necessarily one after the other and is run by two parties in an asynchronous fashion. That is, consider an event- or time-driven forward-secure one-time passcode system (e.g., RSA SecurID®) where, e.g., a hardware token is used to derive one-time authentication passcodes that are checked by an authentication server. Although the token itself may generate all passcodes one-by-one and thus it performs the corresponding key updates also one after the other, the server needs to generate the passcodes only on demand, namely whenever an authentication attempt is received by the user who possesses the token. In this case, the server should generate only the current secret key and not all the secret keys that have been produced by the token since the last successful user authentication. It can be seen that in this case key updates are asynchronous between the token and the authentication server: the token needs only to compute the next key but the server needs to be able to efficiently compute the key that lies many positions ahead from the current key in the order by which keys are produced.

The disclosed construction operates in either of the synchronous or asynchronous settings and guarantees that asynchronous key updates happen very efficiently, without having to perform inefficient sequential updates where all (unnecessary) keys in between are produced one-by-one.

In the exemplary secret-key setting, an efficient forward-secure key-update process boils down to the design of an efficient forward-secure pseudorandom generator. Indeed, produced keys may be drawn pseudorandomly by a large key space that has large underlying entropy, and this can be achieved by employing a forward-secure pseudorandom generator (FS-PRNG for short). In particular, if $r=(r_0, r_1, r_2, r_3, \ldots, r_i, r_{i+1}, \ldots)$ is the sequence of pseudorandom numbers produced by a pseudorandom generator (PRNG), then the i-th such number $r_i$ can be used as the i-th secret key (or better, as the seed for deriving such key), and if additionally this PRNG is forward secure, so that $(r_0, r_1, r_2, r_3, \ldots, r_{i-1})$ is computationally infeasible to produce given $r_i$, then the above mapping leads to a secure implementation of a forward-secure system.

A simple such FS-PRNG can be implemented by repeatedly applying an invertible function over an initial secret seed in a chain. For instance, if $h_1$, $h_2$ are one-way functions, then the new pseudorandom number $r_{i+1}$ can be derived as $r_{i+1}=h_1(r_i)$ and the corresponding new i-th key $k_{i+1}$ can be derived as $k_{i+1}=h_2(r_{i+1})$. In practice, each of the above one-way functions can be can instantiated using cryptographic hashing (e.g, SHA-2).

The term "catch-up cost" is the time needed to update the key on-demand given an old (possibly not the current) key; equivalently, the time needed by the FS-PRNG to produce a forward-positioned (possibly not the next) pseudorandom number given the current pseudorandom number. The term "storage cost" is the storage needed to update the key in an on-demand fashion; equivalently, the storage needed by the FS-PRNG to produce on-demand a forward-positioned pseudorandom number.

There is a natural trade-off between these two performance parameters. It is possible to update keys in an on-demand fashion trivially by sequentially running any key-update process as needed. In general, this approach results in storage-efficient but time-inefficient schemes. For instance, the chained key-update process described above needs only $O(1)$ (i.e., constant) storage but incurs $O(n)$ (i.e., linear) catch-up costs for on-demand computation of keys or pseudorandom numbers that are n-positions ahead in the sequence r above—such updates are referred to as n-step key updates. On the other extreme, an authentication server in the one-time passcodes application may pre-compute and store all possible keys or pseudorandom numbers in r (that correspond to a large enough number of updates); in this case, the catch-up costs can be as low as $O(1)$ (i.e., constant) but the required storage is linear in the size of the sequence r.

The disclosed FS-PRNG supports any mode of operation for the underlying key-update process, namely event-driven, time-driven, synchronous and asynchronous key updates. For example, for time-driven key updates, the disclosed FS-PRNG can be configured so that key updates occur with user-friendly regularities, e.g., using a very intuitive calendar-based update schedule.

Exemplary Applications

A. Secure Client-Server Communications

Suppose a remote client communicates forward-securely with a server on a regular, periodic or on demand fashion. For instance, the client is an end-point device (e.g., a laptop or a smartphone) that periodically or sporadically as needed sends status-update reports (e.g., security logs) to a central Security Information and Event Management (SIEM) server. The communication channel needs to be secure (i.e., it is protected with respect to the integrity and confidentiality of the transmitted messages) in a forward-secure manner. Indeed, if an attacker compromises the end-point device and thus captures all of its secret state (e.g., the secret key that is used to protect the communications with the server), it is important that the attacker is not able to tamper with or read the status-update reports that correspond to the time prior to the compromise and that have not yet been received by the SIEM server (e.g., the security logs that have been buffered in the device while the device was without connectivity).

In this case, key updates can be either event-driven or time-driven, and depending on whether or not the status-update reports are received with loses or out of order by the server, key updates can be asynchronous and on demand at the server side. Since the same one SIEM server will be responsible for a large number of end-point devices that communicate asynchronously with the server, e.g., thousands of machines in a corporate environment, it is crucial that this large number of distinct key-update processes each operates with low catch-up costs and small storage needs.

B. Hardware-Based One-Time Authentication Token

Consider a hardware-based token that produces one-time passcodes for user authentication to a remote server. Here, the canonical example for such applications is the hardware token of RSA SecurID®. The token and the authentication server share the same secret seed through which the passcodes are being pseudorandomly generated. If a token is physically tampered so that its secret state leaks to an attacker, then the attacker can clone the token by reproducing the sequence of passcodes. To detect these token-cloning attacks, it is possible to embed an authenticated and encrypted "heartbeat" status report to each transmitted passcode so that post-tampering authentication attempts are all labelled with a special "red-flag" message that informs the authentication server about the impersonation attempt: indeed, when a physical tampering is sensed by the token (e.g., through a spring attached to the token case) the secret state of the token may simultaneously change to one that is equivalent with the current state, but that encodes an one bit message notifying about the tampering. Thus, by using this alerted secret state, the attacker sends a red-flag message to the server. In this case, the secret states of the token should be updated in a forward-secure manner, or otherwise the attacker may be able to detect that the red-flag bit is set, thus avoiding the transmission of the passcode and the detection. This means that the passcode generation is itself performed in a forward-secure way. In this case, the authentication server needs to run a highly asynchronous key-update process because users make use of the tokens to authenticate themselves very infrequently—and not every minute, the rate with which most one-time passcodes are being produced. Thus, catch-up costs, even for users that have not used their token for a year, must be small, or otherwise an authentication server cannot support hundreds of thousands of users. Similarly, for scalability reasons as in the application above, the storage needs should be minimized. Moreover, tokens are highly resource-constrained devices, thus designing an efficient FS-PRNG in this setting is very challenging.

C. Software-Based One-Time Authentication Token

Like hardware tokens, software tokens need forward security in order to implement intrusion-detection mechanisms (along the lines explained in the two applications above). However, for software-based tokens there is an additional challenge to consider: because the software application is only periodically or sporadically launched (e.g., the application ends when a smartphone is powered off) its key-update process must itself run in a time-driven and on-demand fashion. When the application is launched, the old stored secret state must be updated to the current valid one before the next passcode is computed and shown to the user. The corresponding current key must therefore be computed on demand, and fast catch-up times are crucial for the practicality of this application.

Forward Security Via Pseudorandom Number Generators

Consider the following secret-key setting. A client and a server share knowledge of an initial (common) secret state. Using only this initial common state (thus without direct out-of-band communication of secret information), they wish to make use of an underlying secret-key cryptographic primitive where the corresponding secret key evolves pseudorandomly over time in a forward-secure way: In a computational sense, any newly produced secret key does not reveal anything about any of the previously produced secret keys. In particular, it should be computationally hard for any probabilistic polynomial-time adversary to distinguish a newly produced secret key from a truly random one. That is, in the adversary's view any produced key is essentially a new independent key, despite the fact that this key has been produced as a function of the initial secret information that has also been used to produce all previous keys. Therefore, if the current key is stolen or leaked, then the previous keys are still protected, i.e., unknown to an adversary knowing only the current key.

In practice, such an attack will happen by having the adversary fully compromising the client or the server. Without loss of generality, it is assumed that the adversary can fully compromise only the client. When this happens, the adversary will steal all the secret state of the client, not just the current secret key: in particular, the adversary will possess the secret information used by the client to pseudorandomly produce the new keys. Therefore, in order to achieve forward security, a key-update process is needed that uses some secret state that also evolves over time so that the following property is achieved: given the current secret state of the key-update process, it is computational infeasible to compute any of the keys previously produced by the key-update process. This ensures that if old keys are erased from the client once they are updated by new ones, they remain protected despite the fact that the client may be compromised in the future.

Overall, given that cryptographic secret keys must by definition be some random numbers drawn from a large domain, forward security as discussed herein is reduced to the problem of designing a forward-secure pseudorandom number generator, or FS-PRNG for short. Indeed, the key-update process may employ a pseudorandom number generator (producing numbers of the appropriate size), or PRNG for short, in the straightforward way: each newly produced pseudorandom number is used as the new updated secret key. If the underlying PRNG is forward-secure, then the key-update process is also forward secure.

Forward-Secure Pseudorandom Number Generators

An exemplary FS-PRNG scheme is a pair of algorithms (GenKey, Next) that operate as follows:

Algorithm GenKey takes as input a security parameter and returns an initial state $s_0$ and a master secret key $\sigma$. Thus, $(s_0, \sigma) \leftarrow \text{GenKey}(1^\kappa)$.

Algorithm Next operates in two different modes:

Incremental Mode—Algorithm Next takes as input the current state $s_i$, $i \geq 0$, and updates the state to $s_{i+1}$ and returns a new pseudorandom number $r_i$. Thus, $(r_i, s_{i+1}) \leftarrow \text{Next}(s_i, 1)$.

On-Demand Mode—Algorithm Next takes as input the current state $s_i$, $i \geq 0$, an integer $t>1$, and optionally the master secret key $\sigma$, updates the state to $s_{i+t}$ and returns a new pseudorandom number $r_{i+t-1}$. Algorithm Next performs a t-step update, where $(r_{i+t-1}, s_{i+t}) \leftarrow \text{Next}_{[\sigma]}(s_i, t)$.

In either case, pseudorandom numbers have size $\kappa'$, i.e., $r_i \in \{0,1\}^{\kappa'}$.

With respect to the security of an FS-PRNG scheme, an exemplary FS-PRNG scheme is forward-secure if it holds that given set $S_{i+} \triangleq \{s_{i+t} | t>0\}$, it is computationally hard for any probabilistic polynomial-time adversary to compute any older pseudorandom number $r_j$, $j \le i$.

Above, the optional use of the master secret key σ is made to capture the possibility that more efficient on-demand key updates are possible at the server side through the use of trapdoor information. This is done to achieve generality; the exemplary FS-PRNG scheme does not use such a trapdoor, although one extension of the disclosed exemplary FS-PRNG scheme makes use of such a trapdoor. Also, in $(r_{i+t-1}, s_{i+t}) \leftarrow \text{Next}_{[\sigma]}(s_i, t)$, the indices of the produced numbers r and secret states s differ by one so that conceptually the state is associated with "ready-to-use" (and currently unused) information that is consistently indexed by the number of already produced pseudorandom numbers. For instance, if the current state is $s_4$ then the sequence $(r_0, r_1, r_2, r_3)$ of size four has been already produced and the fifth number $r_4$ is to be produced by $s_4$.

Cost Parameters

There are six main resource costs to consider in connection with an FS-PRNG scheme as defined above.

Storage—The first two costs refer to the storage costs required to run algorithm Next (in either mode of operation) in a forward-secure manner at the client and in a non-forward-secure manner at the server (using master secret key σ). That is, storage $S_c(n)=|s_i|+|s_{i+t}|$ at the client and storage $S_{s[,\sigma]}(n)=|s_i|+|s_t|+|s_{i+t}|$ at the server.

Catch-Up Costs—The other four exemplary costs refer to four in total catch-up costs. The first two catch-up costs are the computational costs required to run algorithm Next in an incremental or on-demand (but forward-secure) manner on the client. The other two catch-up costs are the computational costs required to run algorithm Next in an incremental or on-demand (but non-forward-secure manner) on the server. That is, the time $T_c(t, n)$ required at the client for a t-step update, for t=1 and 1<t≤n, where n is the total number of pseudorandom numbers produced by the FS-PRNG scheme, as well as the time $T_{s[,\sigma]}(t, n)$ required at the server for a t-step update, for t=1 and 1<t≤n.

Exemplary FS-PRNG Construction

In the following discussion, let ƒ, g and h be three one-way functions, each mapping arbitrarily-long binary strings to fixed-size binary strings of size κ', where κ' is the size of the pseudorandom numbers produced by the FS-PRNG scheme.

High-Level Description

As discussed above, an exemplary FS-PRNG scheme uses two one-way functions ƒ and g, where function ƒ is used in a chain to derive a fresh state and function g is used to derive the corresponding pseudorandom number: Indeed, function $(r_{i+t-1}, s_i+t) \leftarrow \text{Next}(s_i, t)$, t>0, can be implemented by first applying sequentially ƒ on $s_i$ exactly t times to get $s_{i+t}$, and then setting $r_{i+t-1}=h(s_{i+t})$, where the set of states $\{s_j | j<i+t\}$ is deleted (by the party who runs algorithm Next). Here, the storage cost is O(1) since $|s_i|=|s_{i+t}|=O(1)$, and the catch-up cost is O(t) since a chain of size t is constructed. G. Itkis, Handbook of Information Security, Ch. Forward Security: Adaptive Cryptography—Time Evolution (John Wiley, 2006) proposes a generic prefix-free based construction. Itkis proposes a scheme that requires only O(log t) computations to compute $s_t$ from $s_0$ using, however, O(t) storage. The disclosed exemplary FS-PRNG scheme improves upon the above naive chain-based construction but also upon Itkis' proposal. For a balanced configuration, the disclosed exemplary scheme has storage cost of O(log t) and computational costs O(1) and O(log t) for computing $s_t$ incrementally or on-demand, respectively. The disclosed exemplary FS-PRNG scheme is based on non-standard tree-like structures that may have any degree (i.e., a node may have one, two or more children) and that include a chain of nodes, overall achieving both low storage and low catch-up costs.

A. Bottom-Up View

The chain-based FS-PRNG scheme achieves an unbalanced trade-off between storage and catch-up cost: storage is optimal, i.e., constant (independent of the of t, the size of the step), but the catch-up cost is very high, i.e., linear (proportional to the size t of the step). The disclosed exemplary approach fixes this unbalanced performance trade-off as follows. Consider a fully developed chain as above of length n, i.e., the full chain that will be produced in order to generate the total number n of pseudorandom numbers that the FS-PRNG outputs. Then, the following changes are made over the chain-based FS-PRNG structure to produce a new better-balanced composite FS-PRNG structure:

Chain Partition—First, to improve the catch-up cost, "shortcut" states are kept, say one state $s_i$, i=k·d, every d steps, $1 \le k \le \lceil n/d \rceil$. However, to maintain forward security this initial chain is separated into $\lceil n/d \rceil$ pieces: the initial chain is partitioned into $\lceil n/d \rceil$ elementary chains, each one seeded by an initial state $s_i$, i=k·d. This already provides an improved, more balanced trade-off between storage and catch-up cost: Indeed, at $O(\lceil n/d \rceil)$ new total storage cost, i.e., with total storage that is increased by a factor of $\lceil n/d \rceil$, the new catch-up cost now becomes $O(\min\{t,d\})$ which is improved compared to O(t) by a factor of at most d.

Seed Compaction—Second, to improve the storage cost, the $\lceil n/d \rceil$ states (that are the seeds of the elementary chains) are grouped in $\lceil \lceil n/d \rceil / l \rceil$ groups of size l, where the states of each group is replaced by a "root" state $s'_l$, $1 \le l \le \lceil \lceil n/d \rceil / l \rceil$. This means, each one of the l states belonging to group l is produced by applying a "distinct" one-way function g over the root state $s'_l$: In particular, the j-th state $s_{j,l}$ of group l is set to be $s_{j,l} = g(s'_l \| x_{j,l})$, where $x_{j,l}$ is a fixed but unique per j and l, fixed-size binary string, e.g., $x_{j,l} = j \| l$ where j and l are of the same fixed length. However, to maintain forward security these l seeds of group l are computed at once, while deleting the root seed $s'_l$. This provides an even more improved, even more balanced trade-off between storage and catch-up cost: Indeed, the storage cost is reduced by a factor of l at the cost of increasing the catch-up cost by a factor of l. This last increase comes from the fact that group seeds must be computed at once whenever there is need to produce any one of these seeds.

Recursive Partitions and Compactions—Recursively, the achieved trade-off between storage and catch-up costs can optionally be improved by considering the root seeds to be part of a new chain, then partitioning this chain into smaller elementary chains using a new parameter d', and then grouping the seeds of these elementary chains into groups using a new parameter l', while keeping only one root seed per such group, etc., until a level of recursion is reached that achieves a balanced trade-off between storage and catch-up costs. At the higher level of recursion, a single chain is kept that consists of linked root seeds and that is seeded by a "master" seed for the entire composite FS-PRNG structure.

This new composite FS-PRNG structure is actually a highly irregular, non-standard tree structure that defines the exact way through which seeds and pseudorandom numbers are to be produced in the disclosed exemplary FS-PRNG scheme. However, this complicated tree FS-PRNG structure is not explicitly stored or represented in the state defined and used by the disclosed exemplary FS-PRNG scheme. Instead, the algorithm Next carefully produces parts of this tree as needed, incrementally or on-demand, so that new pseudorandom numbers are constructed in a forward-secure way. The tree structure is stored by the algorithm Next only implicitly: The regularities in the tree structure are used by this algorithm to produce new parts of the tree, i.e., new seeds, based solely on some small-size state that consists of a small number of previously produced such seeds.

B. Top-Down View

In a top-down view, the disclosed exemplary chain FS-PRNG scheme (that uses a one-way function $f$ sequentially to produce states that are mapped to corresponding pseudorandom numbers by applying a one-way function h) is hierarchically combined with a tree-based or, more accurately, a star FS-PRNG scheme (where a tree-node seed is at once used to produce seeds for each one of its children using a child-specific application of a one-way function g), as follows.

Starting from a higher-level FS-PRNG chain of finite length, for simplicity and without loss of generality, that produces pseudorandom numbers $r=r_0, r_1, \ldots, r_m$ (through functions $f$ and h as described above), each such number $r_l$, $0 \leq l \leq m$, is used to derive l new pseudorandom numbers $c_1^l$, $c_2^l, \ldots, c_l^l$ as $c_j^l = g(r_l \| x_{j,l})$ for fixed binary strings $x_{j,l}$ that are easy to describe, e.g., $x_{j,l} = j \| l$. Then, each such produced $c_j^l$ is used as the seed for another lower-level FS-PRNG chain of fixed length, say $k \geq 1$, and continue recursively for a desired number of levels. This procedure defines an unbalanced finite tree of fixed depth, whose internal-level nodes correspond to all possible seeds that can be used to produce other seeds, and whose lowest-level nodes correspond to terminal seeds that are used to produce pseudorandom numbers through the hash function h. This tree is produced in an incremental or on-demand way (as needed at the client or the server, respectively) so that forward security is achieved and so that both the client and the server keep state that is of minimal size. The following rules are used in order to gradually, as needed, construct parts of the tree in a forward-secure way while keeping minimal state, i.e., only keeping those seeds that do not compromise forward-security and that are necessary for producing future pseudorandom numbers:

1. The children of a parent node are computed at once; then the parent is deleted;
2. When a successor node in a chain is computed, all predecessor nodes are deleted; and
3. The state $s_i$ of the disclosed exemplary FS-PRNG scheme includes at most one unused and most recent possible seed for each chain in the tree, and these seeds are related through a "path over chains" in the tree.

Detailed Exemplary FS-PRNG Scheme

The disclosed exemplary FS-PRNG scheme is defined using an underlying FS-PRNG tree structure, or FR-PRNG tree for short. This tree corresponds to the tree produced by the two recursive descriptions of the disclosed exemplary approach discussed above. The structure of this tree is defined as a function of some parameters that control its depth, expansion branching, and chain sizes. Each node v in the FS-PRNG tree is labeled with a seed $S(v)$ (i.e., a pseudorandom number). The exemplary FS-PRNG tree consists of paths (representing chains of seeds produced sequentially) and stars (representing a parent seed with its children seeds produced at once).

As used herein, an exemplary $(s, k, f(\cdot))$ FS-PRNG chain is a labeled path $p=(p_1, p_2, \ldots, p_k)$ of size $k \geq 1$, where the head $p_1$ of the path is labeled with seed $S(p_1)=s$ and the i-th path node $p_i$, $1 \leq i \leq k$, is labeled with seed $S(p_i)=f(S(p_{i-1}))$. $p_k$ is the tail of the path p.

As used herein, an exemplary $(s, l, g(\cdot))$ FS-PRNG star is a labeled rooted tree consisting of a root r that has exactly $l \geq 1$ children $\{c_1, c_2, \ldots, c_l\}$, where the root r is labeled with seed $S(r)=s$ and the i-th child node $c_i$, $1 \leq i \leq l$, is labeled with seed $S(p_i)=g(S(r) \| x_{i,r})$ where $x_{i,r}$ is a fixed per pair (i, r) binary string that can be described by (i, r). We say that $c_1, c_l$, are respectively the first child and that last child of r.

As used herein, an exemplary $(s, d, (k_0, l_1), (k_1, l_2), \ldots, (k_{d-1}, l_d), k_d, f(\cdot), g(\cdot))$ FS-PRNG tree is a labeled rooted non-standard tree that consists of the following exemplary tree components:

The tree has root r that is labeled with seed $S(r)=s$;
The tree has exactly d+1 levels where level 0 is the top level and level d is the lowest level in the tree.
The tree is defined and labeled recursively as follows:
Nodes at level 0 are defined through the $(s, k_0, f(\cdot))$ FS-PRNG chain, where $k_0 \geq 1$ and the head of this chain is the root r of the tree.
For i=0, 1, ..., d−1, nodes and their labels at level i+1 are defined by the nodes and their labels at level i as follows: The j-th node $v_j^i$ of a chain at level i, $1 \leq j \leq k_i$, defines exactly $l_{i+1} \cdot k_{i+1}$ nodes of level i+1 through the following two steps:
First, $l_{i+1}$ child nodes $c_1^i, c_2^i, \ldots, c_{l_{i+1}}^i$ of $v_j^i$ are defined and labeled through an FS-PRNG star $(S(v_j^i), l_{i+1}, g(\cdot))$, where $l_{i+1} \geq 1$;
Second, $l_{i+1} \cdot k_{i+1}$ path nodes are defined and labeled through $l_{i+1}$, FS-PRNG chains $(S(c_1^i), k_{i+1}, f(\cdot))$, $(S(c_2^i), k_{i+1}, f(\cdot)), \ldots, (S(c_{l_{i+1}}^i), k_{i+1}, f(\cdot))$, where $k_{i+1} \geq 1$.
The tree has exactly $$n = k_0 \cdot \prod_{i=1}^{d} (k_i \cdot l_i)$$

leaf nodes at level d+1.
The tree is non-standard in the sense that path nodes that belong to a given chain are considered to belong to the same level of the tree. That is, no parent-child relationships are defined among path nodes of the same chain. However, parent-child relationships are defined in the standard way for nodes that are defined through FS-PRNG stars; namely, the heads of all chains in the tree are the only nodes that have a parent node in the tree.
The tree imposes a natural ordering over the nodes that lie at the same level of the tree by considering an exemplary "left-to-right" direction in the tree according to the following conventions:
(a) For path nodes of a specific chain, the left-to-right ordering is defined as follows: path nodes that are closer to the head of the chain are "in the left" of path nodes that are further away from the head;
(b) For path nodes that belong to different chains (but in the same level, say i, of the tree), the left-to-right ordering is defined as follows: such path nodes inherit the left-to-right relations that exist among their ancestors that lie at the same chain (at level j<i of the tree; such ancestor nodes lying at a common ancestor chain always exist).
(c) For tree nodes that lie at different tree levels no left-to-right relation is defined.

Figure 2:
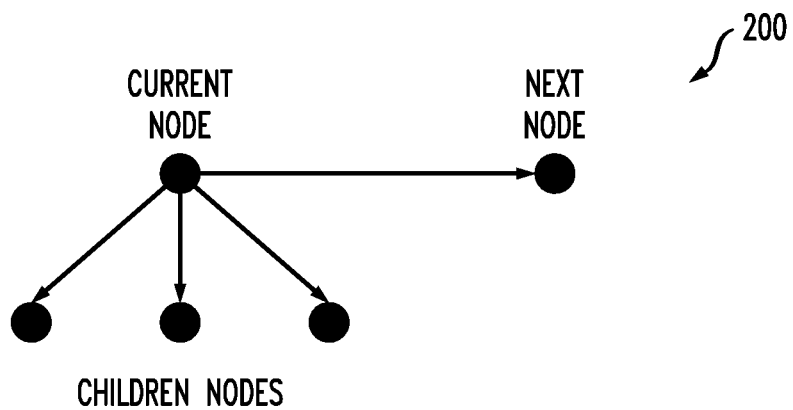
FIG. 2 illustrates a portion of an exemplary FS-PRNG tree that can be employed by the present invention.

FIG. 2 illustrates a portion of an exemplary FS-PRNG tree 200 that can be employed by the present invention. As shown in FIG. 2, the exemplary FS-PRNG tree portion 200 comprises a plurality of nodes. Nodes can expand from a current node in two ways. Nodes can be part of a chain, where the next node in the chain can be generated from a node (up to some maximum chain length), as discussed further below in conjunction with FIG. 3. In addition, nodes can have children, which can each be computed from the current node, as discussed further below in conjunction with FIG. 4.

Figure 3:
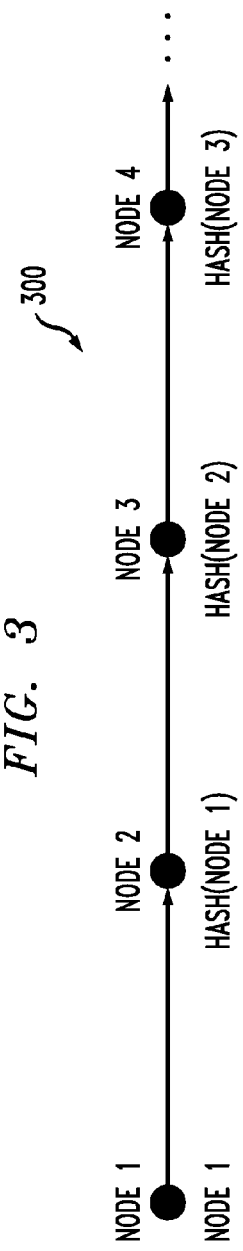
FIG. 3 illustrates a computation of a next node in a chain of an exemplary FS-PRNG tree.

FIG. 3 illustrates a computation of a next node in a chain 300 of an exemplary FS-PRNG tree. Generally, the next node in a chain 300 is obtained by applying a hash function to the prior node, as follows:

Node2=Hash(Node1);
Node3=Hash(Node2)=Hash(Hash(Node1)): and
Node4=Hash(Node3)=Hash(Hash(Node2))=Hash(Hash(Hash(Node1))).

Figure 4:
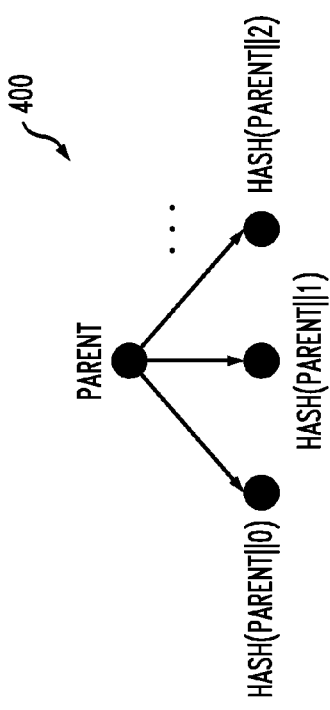
FIG. 4 illustrates a computation of one or more child nodes of a parent node of an exemplary FS-PRNG tree.

FIG. 4 illustrates a computation of one or more child nodes of a parent node of an exemplary FS-PRNG tree 400. Generally, a child node of a current is obtained by applying a hash function to the parent node, contained with an index of the child (e.g., Child_i=Hash(Parent∥i), as follows:

Child_0=Hash(Parent∥0);
Child_1=Hash(Parent∥1); and
Child_2=Hash(Parent∥2).

As indicated above, a $(d, (k_0, l_1), \ldots, (k_d, l_d), k_d))$ tree is specified as follows:

(total tree depth (d),
(length of chain at level 0 ($k_0$),
number of children of level 0 parent ($l_1$)),
(length of chain at level 1 ($k_1$),
number of children of level 1 parent ($l_2$)),
(length of chain at level d−1 ($k_{d-1}$),
number of children of level d−1 parent ($l_d$),
length of chain at level d ($k_d$)
).

Figure 5:
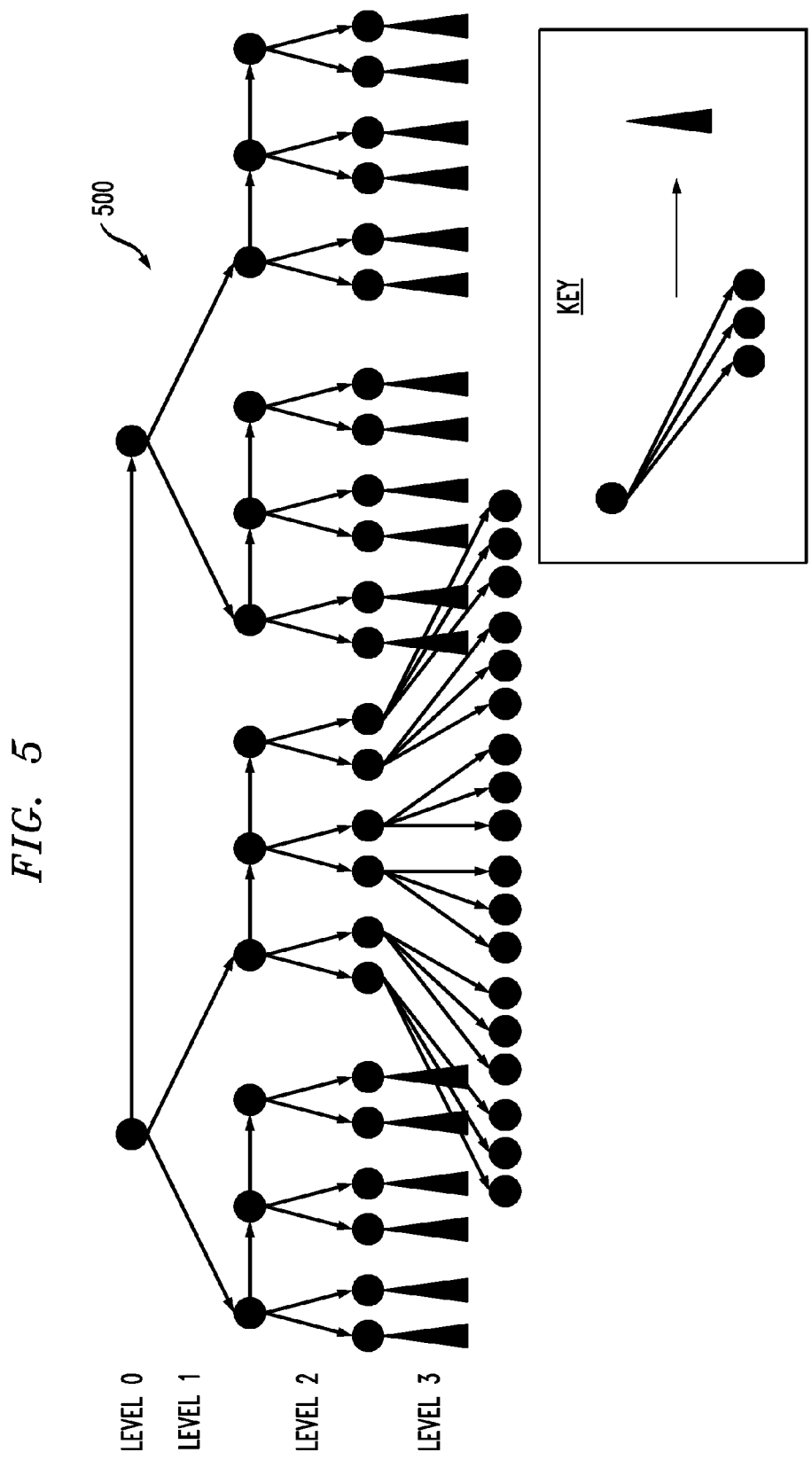
FIG. 5 illustrates an exemplary (3, (2,2), (3,2), (1,3), 1) tree.

FIG. 5 illustrates an exemplary (3, (2,2), (3,2), (1,3), 1) tree 500. The exemplary tree 500 shown in FIG. 5 thus has a depth of 3 and 4 levels. The first level (level 0) has a chain length of 2, and a degree of 2. The second level (level 1) has a chain length of three, and a degree of two. The third level (level 2) has a chain length of one, and a degree of three. Finally, the fourth level (level 3) has a chain length of one (and no children).

Figure 6:
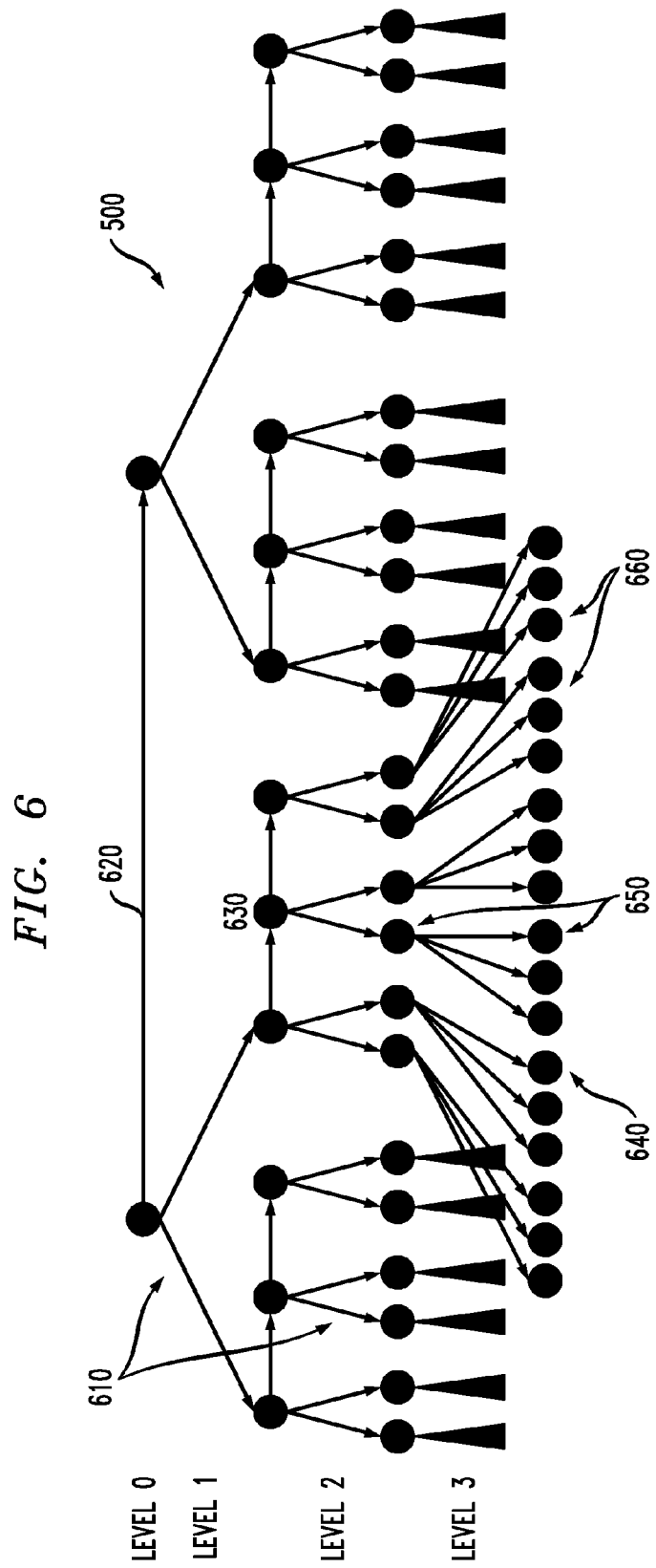
FIGS. 6 through 8 illustrate the exemplary tree of FIG. 5 in further detail.

FIG. 6 illustrates the exemplary (3, (2,2), (3,2), (1,3), 1) tree 500 of FIG. 5 in further detail. As shown in FIG. 6, the exemplary tree 500 comprises a number of stars 610 having two children, a chain 620 having two nodes, a chain 630 having three nodes, a star 640 having three children, a number of chains 650 of size one, and a number of leaf nodes 660. The total number of leaf nodes 660 is equal to 72 (2*2*3*2*3).

Figure 7:
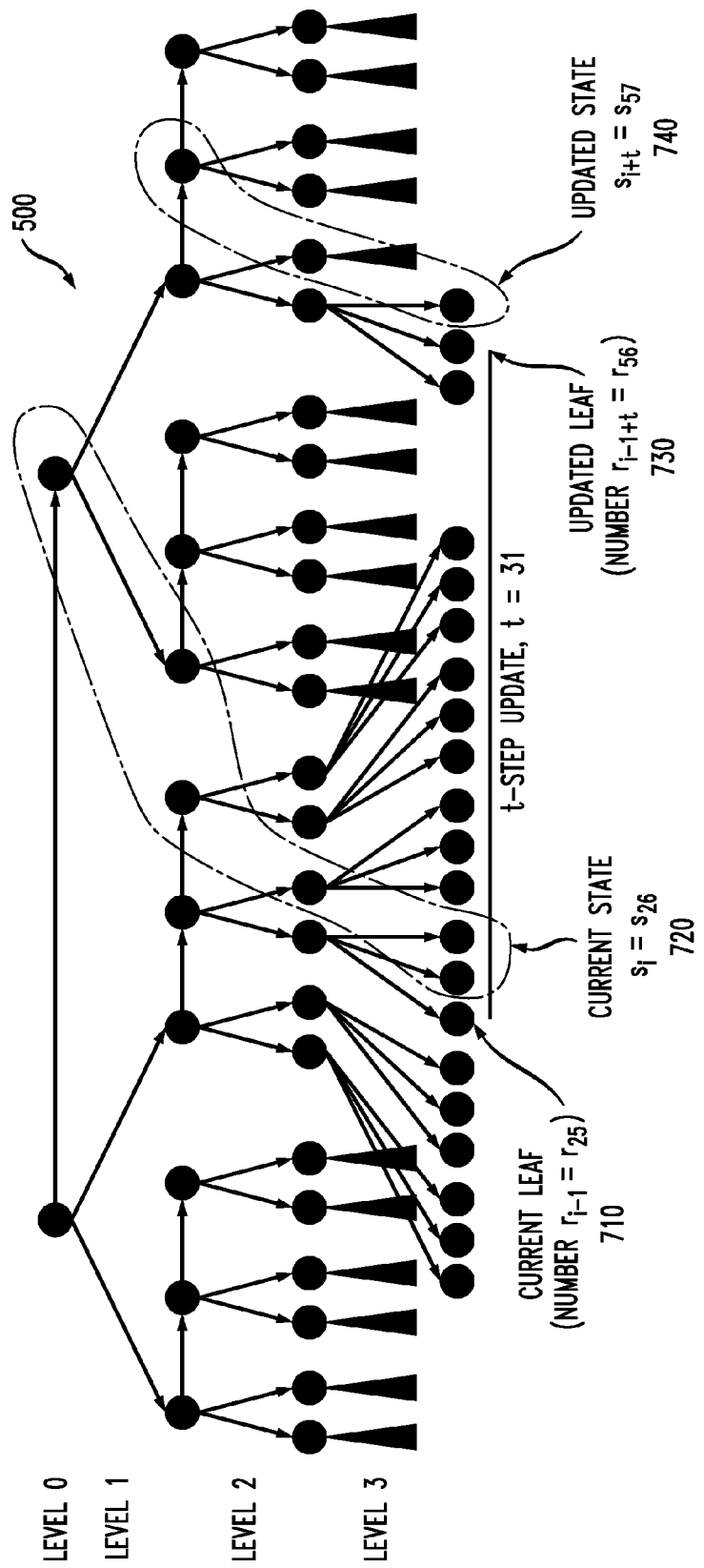

FIG. 7 illustrates the exemplary (3, (2,2), (3,2), (1,3), 1) tree 500 of FIG. 5 in further detail. As shown in FIG. 7, the exemplary tree 500 comprises a current leaf node 710 (number $r_{i-1}=r_{25}$); a current state 720 $s_i=s_{26}$ comprised of four nodes; an updated leaf 730 (number $r_{i-1+t}=r_{56}$) and an updated state 740 $s_{i+t}=s_{57}$ comprised of three nodes. The manner in which the current state 720 and updated state 740 are populated using successor and sibling rules is discussed further below.

As discussed hereinafter, aspects of the present invention generate a forward secure pseudorandom number $r_{i+t-1}$, given the current state 720 and the t-step update. The current state 720 has a current leaf node 710 that produces a first pseudorandom number $r_{i-1}$, by updating the current state 720 to the updated state 740 corresponding to the updated leaf node 730. The forward secure pseudorandom number $r_{i+t-1}$ corresponds to the updated leaf node 730.

Figure 8:
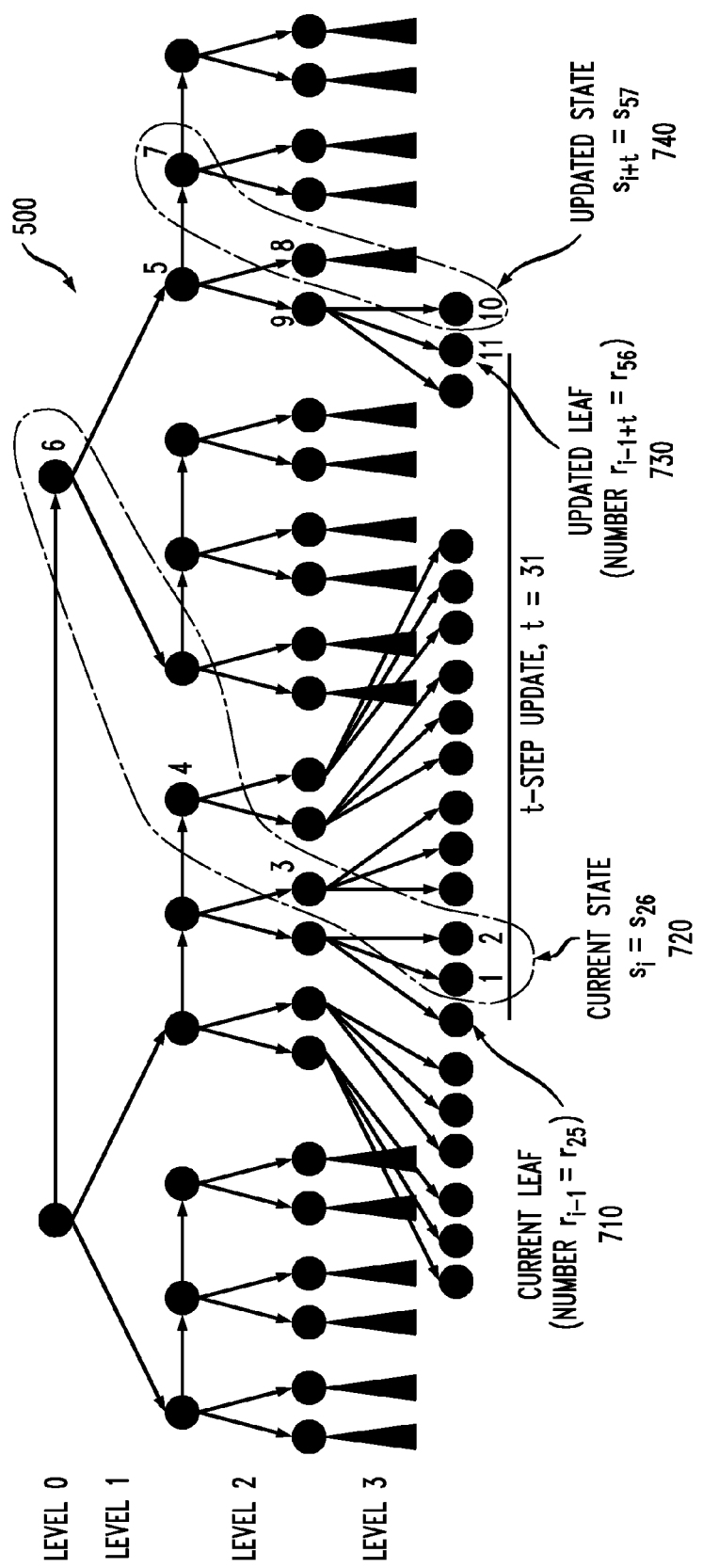

FIG. 8 illustrates an exemplary order of operations on the exemplary (3, (2,2), (3,2), (1,3), 1) tree 500 of FIG. 5 in further detail. As shown in FIG. 8, in order to update the current state 720 to the updated state 740 corresponding to the updated leaf node 730, the following exemplary order of operations is performed:

Upward tree traversal from current state 720:
delete(node 1); delete(node 2); delete(node 3); delete(node 4).

Downward tree traversal from node in current state 720 at level 0 to updated leaf node 730:
compute(node 5); delete(node 6); compute(node 7); compute(node 8); compute(node 9); delete(node 5); compute (node 10); compute(node 11); and delete(node 9).

Figure 9:
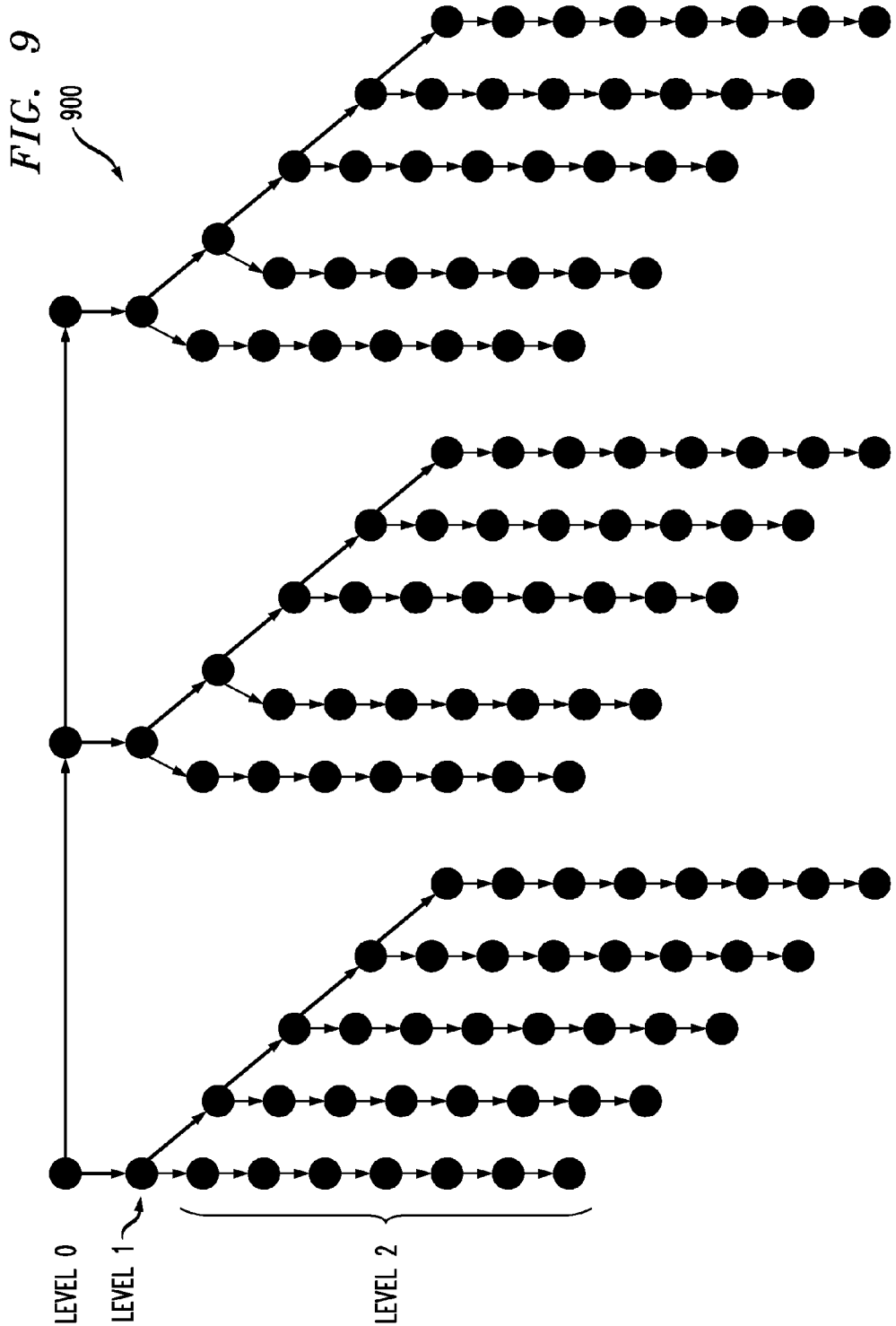
FIG. 9 illustrates an exemplary (2, (12,1), (5,1), 7) tree that may be used, e.g., for generating daily pseudorandom numbers over three months.

FIG. 9 illustrates an exemplary (2, (12,1), (5,1), 7) tree 900. The exemplary tree 900 shown in FIG. 9 may be used, for example, for daily generating pseudorandom numbers over three months. The various levels in the tree 900 represent months, weeks and days with up to five weeks/month. It is noted that not all seeds of the nodes are used. The highest level is a chain of three months, and the second level is a chain of 5 weeks. It is noted that the lowest level in the tree 900 is a chain of seven days, and is illustrated vertically for ease of illustration.

Algorithm GenKey

Algorithm GenKey takes as input the security parameter κ and returns an initial state $s_0$ by randomly selecting $s_0$ from all binary strings of size κ. That is, $s_0 \xleftarrow{\$} \{0,1\}^\kappa$. (The master secret key is not used, or set to ⊥.)

Algorithm Next General Method

To implement a t-step update, t≥0, exemplary algorithm Next takes as input the current state $s_i$, i≥0, updates the state to $s_{i+t}$, and returns a new pseudorandom number $r_{i+t-1}$.

The exemplary state $s_i$ stored by algorithm Next:

For i=0, state $s_i$ consists of the initial seed $s_0$ that is the output of algorithm GenKey.

For i>0, state $s_i$ consists of an ordered sequence of seeds, i.e., an order sequence of labels of some nodes in the FS-PRNG tree. In particular, let $v_i$ be the current leaf node defined as the (i)-th left-most leaf node in the tree, i.e., the (i)-th left-most node lying at the lowest level d. Node $v_i$ is the leaf node that corresponds to the most recently produced number $r_{i-1}$ through the most recent operation $(r_{i-1}, s_i) \leftarrow \text{Next}(s_{i-t}, t)$ for some t≥1. Consider the path $p_{v_i}$ in the tree that connects $v_i$ to the root r of the tree. Note that this path is not defined solely by parent-child relationships since it passes also through some chains. Let $X=\{C_d, C_{d-1}, \ldots, C_0\}$ be the set of chains visited by path $p_{v_i}$ (there are exactly d+1 such chains as $p_{v_i}$ visits exactly one chain $C_j$ per tree level j). For j=d, d−1, ..., 0, let $p_i^j$ be the right-most path node of chain $C_j$ that $p_{v_i}$ visits, let $\overline{p}_i^j$ be the path node in $C_j$ that is immediately to the right of $p_i^j$, if such node exists. Also, let $h_{C_j}$ denote the head node of chain $C_j$ and if $h_{C_j}$ is the m-th (left) child of its parent, 1≤m≤$l_j$, let $\Re S S(C_j)=\{C_m^j, C_{m+1}^j, \ldots, C_{l_j}^j\}$ be chains of level j whose head nodes are right-siblings of node $h_{C_j}$. As used herein, a "higher order" sibling node is a node "to the right" in a left-to-right implementation and a a node "to the left" in a right-to-left implementation. Then, for each such chain $C_j \in X$, state $s_i$ includes at most one seed if j=d and up to $l_j+1$ seeds if 0≤j<d.

In particular, state $s_i$ includes exactly the following seeds:

For level j=d, if $v_i$ is not the tail of chain $C_d$ then state $s_i$ includes $S(v_{i+1})$, i.e., $S(v_{i+1})=S(\overline{p}_i^d) \in s_i$.

For level j, 0≤j<d, then
if $p_i^j$ is not the tail of $C_j$, then state $s_i$ includes $S(\overline{p}_i^j)$, i.e., $S(\overline{p}_i^j) \in s_i$; and for any chain C'∈ PΣ (C$_j$), i.e., for which h$_{C'}$ is a sibling node in the right of h$_{C_j}$, then state s$_i$ includes S(h(C')), i.e., S(h(C'))∈s$_i$.

Generally, state s$_i$ is updated as follows. On input state s$_i$, as defined above, and integer t>0, exemplary algorithm Next 1100, as discussed further below in conjunction with FIG. 11, performs two tasks:

1. Updates the state s$_i$ to state s$_{i+t}$ that corresponds to a new, updated current leaf node v$_{i+t}$; and
2. Computes the new pseudorandom number r$_{i+t-1}$ as the number that corresponds to the new current leaf node v$_{i+t}$.

Exemplary algorithm Next maintains the following invariance:

State s$_i$ is defined with respect to the current leaf v$_i$ which is used to produce the most recent pseudorandom number r$_{i-1}$.

Exemplary algorithm Next represents the state s$_i$ as a sequence of annotated seeds as follows:

A queue Q is used to store the seeds that state s$_i$ consists of;
Each seed S(v) ∈ s$_i$ is annotated with some auxiliary information; in particular, the node v is represented as a structure N that has the following fields:
  (a) Seed value seed, i.e., N.seed=S(v);
  (b) Level level, i.e., N.level is the level in the tree that v lies at;
  (c) Path position pp, i.e., N.pp=i if v is the i-th (left-most) path node in the chain that v belongs to;
  (d) Capacity cap, i.e., N.cap is defined as the total number of leaf-node seeds that are derived from the seed S(v) in the tree, including S(v) if v is a leaf node.

Figure 10:
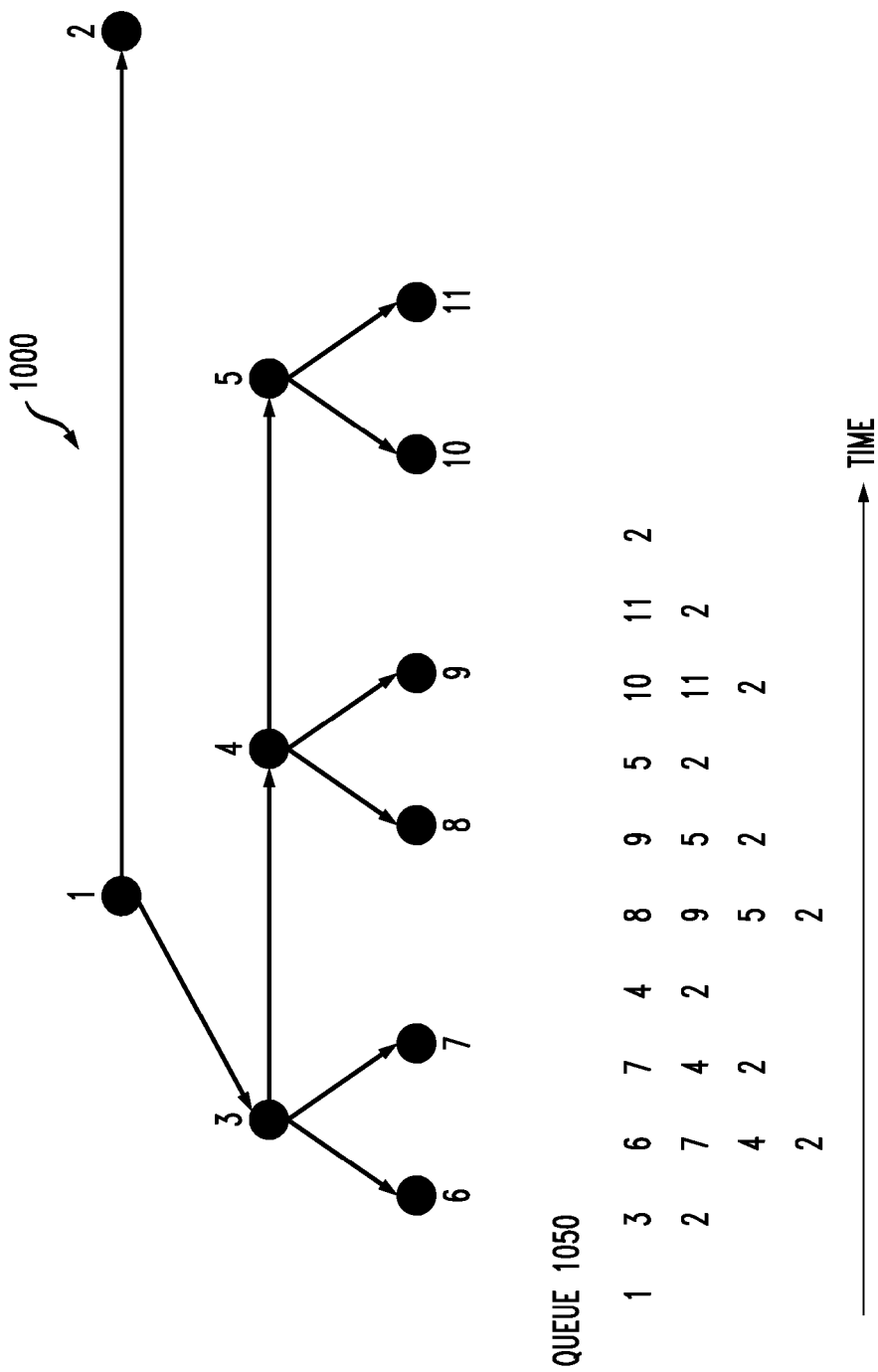
FIG. 10 illustrates a traversal of a tree using a queue.

FIG. 10 illustrates a traversal of a tree 1000 using a queue 1050. As shown in FIG. 10, the exemplary tree 1000 comprises 11 nodes 1-11 in three levels. In an exemplary implementation, the queue 1050 can be implemented as a last-in-first-out buffer. The next algorighm 1100, as discussed further below in conjunction with FIG. 11, initially processes node 1 which appears in the queue 1050. The next algorighm 1100 determines that node 1 is a higher level node (and not a leaf node), and expands node 1 to include successor node 2 and child node 3 in the queue 1050. The next algorighm 1100 then "pops" the queue 1050 and determines that the node at the top of the queue is node 3.

Node 3 is a higher level node, and node 3 is expanded to include node 2, successor node 4 and child nodes 6 and 7 in the queue 1050. It is noted that sibling nodes, such as nodes 6 and 7, are added to the queue 1050 in a reverse order (e.g., right-to-left), so that the left most node appears at the top of the queue 1050 first. Node 6 is now at the top of the queue 1050 and is a leaf node, so node 6 is consumed to generate a corresponding pseudorandom number, leaving node 7 at the top of the queue (with nodes 4 and 2). Processing of the queue 1050 continues in a similar manner where leaf nodes that are popped are consumed, and higher level nodes that are popped are expanded, as would be apparent to a person of ordinary skill in the art based on the discussion herein.

Algorithm Next Detailed Description

It is assumed that the exemplary algorithm Next knows the parameters of the FS-PRNG tree, i.e., the parameters d, (k$_0$, l$_1$), (k$_1$, l$_2$), ..., (k$_{d-1}$, l$_d$), k$_d$, f(·), g(·). Thus, Next knows the total number n of leaf nodes in the tree, where $$n = k_0 \cdot \prod_{i=1}^{d} (k_i \cdot l_i).$$

Also, let w(j) denote the weight of a node v at level j, defined as the total number of leaf-node seeds that are derived from v only through its children in the star in which v is the root node; that is, $$w(j) = \prod_{i=j+1}^{d} (k_i \cdot l_i),$$

if 0≤j<d, and by convention w(d)=1. It is assumed that algorithm Next knows these d+1 weights as additional parameters.

Given as input state s$_i$, which is stored using a queue Q, and an integer t>0, algorithm Next operates according to the following pseudocode. As discussed further below in conjunction with FIGS. 11-13, exemplary algorithm Next 1100 employs two helper procedures getNextLeafSeed( ) 1200 and expand( ) 1300: the getNextLeafSeed( ) procedure 1200 computes the new current leaf node, i.e., the required leaf-node seed for a t-step update; the second expand( ) procedure 1300 produces on-demand new seeds in the tree, as needed in a t-step update.

FIG. 11 illustrates pseudocode for an exemplary implementation of algorithm Next 1100. As shown in FIG. 11, exemplary algorithm Next 1100 comprises the following steps:
 (1) if i=0 then N←[s$_0$, 0, 1, n] and Q.push(N);
 (2) N←getNextLeafSeed(t);
 (3) r$_{i+t-1}$←h(N.seed);
 (4) delete(N);
 (5) return r$_{i+t-1}$;

FIG. 12 illustrates pseudocode for an exemplary implementation of helper procedure getNextLeafSeed( ) 1200. As shown in FIG. 12, exemplary helper procedure getNextLeafSeed( ) 1200 comprises the following steps:

(1) dist ← t;
 (2) while dist > 0
    a. N ← Q.pop( );
    b. if dist > N.cap then
       i. dist ← dist − N.cap;
       else
       i. dist ← expand(N,dist);
       ii. if dist = 0 then return N;
    c. delete(N);

FIG. 13 illustrates pseudocode for an exemplary implementation of helper procedure expand( ) 1300. As shown in FIG. 13, exemplary helper procedure expand( ) 1300 comprises the following steps:

(1) if N.pp < k$_{N.level}$ then
    a. M ← [f(N.seed), N.level, N.pp + 1, N.cap − w(N.level)];
    b. Q.push(M);
 (2) if [( N.level = d and dist = 1) or w(N.level) < dist] then return dist − w(N.level);
 (3) j = 1;
 (4) while (dist > w(N.level + 1) )
    a. dist dist ← w(N.level + 1)
    b. j ← j + 1;
 (5) for i = l$_{N.level+1}$ down to j
    a. M ← [g(N.seed ||i|| N.level), N.level + 1, 1, w(N.level + 1)];
    b. Q.push(M);
 (6) return dist;

Exemplary Procedure getNextLeafSeed( ) 1200 takes as input the step t and operates over the state s$_i$, which is stored in a queue Q, to compute the leaf node $v_{i+t}$ in the FS-PRNG that is t positions to the right of the current leaf node $v_i$ (which itself corresponds to the most recently produced pseudorandom number). Recall that the state $s_i$ contains a small set of seeds of the tree; as the procedure expand( ) guarantees, these seeds have been added in Q in decreasing order according to their levels and, additionally, in decreasing order according to the ranges of positions of the leaf nodes at level d that they can derive. Exemplary Procedure getNextLeafSeed 1200 performs an efficient search over these seeds to locate which seed, if expanded, can produce the target seed at leaf $v_{i+t}$ (while-loop at line 2). As long as node $v_{i+t}$ cannot be derived by the low-level seeds that are part of the state $s_i$, these seeds are no longer useful and therefore are discarded. Whenever a seed is found that derives leaf-node seeds that contain the target seed (the else statement in line 2.(b)), this seed is to be expanded through the use of procedure expand( ) 1300.

Exemplary Procedure expand( ) 1300 appropriately applies the hash functions $f$ and g to its input seed, to derive a next path node, if such node exists (line 1), and the next level children, if such nodes exist and are necessary to be derived (lines 4 and 5). In particular, any child node of the input seed that derives seeds that are certainly on the left of the target seed are completely discarded and never derived. Those children that derive ranges of leaves that either contain the target seed or that are all to the right of the target seed are derived. All derived seeds are added in Q according to the ordering discussed above: the next path node is inserted first (line 1(a)), and then the children are inserted in right-to-left order (line 5(a)). At the same time, expand( ) 1300 appropriately updates the distance to the target seed, which is actually returned to the calling procedure getNextLeafSeed( ) 1200. The end of the search is thus reached whenever expand( ) 1300 reports a distance of size 0 to the target seed.

Security and Performance

Security

The disclosed exemplary FS-PRNG achieves security, i.e., it implements a forward-secure pseudorandom number generator. First, the disclosed exemplary FS-PRNG implements a pseudorandom number generator as it employs the use of three one-way functions (f, g and h), following the general pattern used by Hugo Krawczyk, "Simple Forward-Secure Signatures from any Signature Scheme," ACM Conf. on Computer and Communications Security, 108-115 (2000); and Mihir Bellare and Bennet Yee, "Forward-Security in Private-Key Cryptography," CT-RSA'03: Proc. of the 2003 RSA Conf. on the Cryptographers' Track, 1-18 (Berlin, Heidelberg, Springer-Verlag, 2003), which is described in a more generalized form by Itkis, referenced above. This general pattern allows construction of an FS-PRNG from any pseudorandom number generator (PRG), which in turn is based on the general PRG construction method by Håstad et al., "A Pseudorandom Generator from any One-Way Function," SIAM J. Comput., 28(4):1364-1396 (1999), that employs the use of a one-way function.

Second, the disclosed exemplary FS-PRNG achieves forward security by construction. Recall that with respect to the security of an FS-PRNG scheme, the following property should hold for all i>0:

Given set $S_{i+} \cong \{s_{i+t} | t>0\}$, it is computationally hard for any probabilistic polynomial-time adversary to compute any older pseudorandom number $r_j$, j≤i.

The disclosed exemplary FS-PRNG scheme achieves the above property, actually in a stronger sense: Given set $S_{i+} \cong \{s_{i+t} | t>0\}$, it is computationally hard for any probabilistic polynomial-time adversary to compute any older state $s_j$ or any older pseudorandom number $r_j$, j≤i. This holds by construction in the disclosed exemplary scheme for the following two reasons:

1. For each old state $s_j$, j≤i, any new state $s_{i+t}$, t>0, does not contain at least one seed S(v) (for some node v in the FS-PRNG tree) that is contained in $s_j$. Indeed, algorithm Next 1100 (in line 4) and procedure getNextLeafSeed 1200 (in line (c)) explicitly delete at least one tree-node seed that is part of the current state but is not included in the new state.

2. For each seed S(v) that is contained in any given state $s_i$, i≥0, it holds that the set of leaf-node seeds in the FS-PRNG tree that can be derived by S(v) contains only unused such seeds, i.e., seeds that have not been used to derive (through function h) any of the previously produced pseudorandom numbers $r_0, r_1, \ldots, r_{i-1}$. Indeed, procedure expand( ) 1300 adds in the state only nodes that are freshly generated through the functions $f$ (line 1(a)) and g (line 5(a)). At the same time, procedure getNextLeafSeed( ) 1200 explicitly deletes each "skipped", i.e., useless and unused, seed (line 2(c)) and Next procedure 1100 makes use of a leaf-node seed only once (line 3) and right away it explicitly deletes this used seed (line 4).

The above two properties imply forward security, since the current state $s_i$ cannot be feasibly used to derive any previously computed pseudorandom number: In order to compute such an older number one has to invert a one-way function.

Performance

The disclosed exemplary FS-PRNG scheme achieves a parameterizable balanced trade-off between storage and catch-up costs, which can be optimized as needed by the target application that makes use of the FS-PRNG. In particular, when an (s, d, $(k_0, l_1), (k_1, l_2), \ldots, (k_{d-1}, l_d), k_d, f(\cdot), g(\cdot))$ FS-PRNG tree is used by our FS-PRNG scheme, with $$n = k_0 \cdot \prod_{i=1}^{d} (k_i \cdot l_i)$$

being the total number of numbers produced by the scheme, then the disclosed exemplary FS-PRNG achieves the following performance bounds with respect to the two cost parameters of interest:

Storage—State $s_i$ contains at most one seed per chain in the FS-PRNG tree. At the same time, those chains for which $s_i$ includes exactly one seed are linked by a leaf-to-root path that is defined for the current leaf node in the tree. Therefore, $s_i$ contains at most $l_i$ seeds per level of the tree. Thus, the total storage needs in our FS-PRNG scheme is $S_c(n)=S_s(n)=O(l_1+l_2+\ldots+l_d)$.

Catch-Up Cost—State $s_i$ contains seeds that are related to the leaf-to-root path P of the current leaf node in the tree. For any t-step update algorithm Next first traverses this path P upwards (through procedure getNextLeafSeed( )) to skip those seeds that are unnecessary to expand, spending O(1) time per three level, and then it traverses the leaf-to-root path P' corresponding to the new current leaf node in the tree, downwards (through procedure expand( )) to derive the target leaf-node seed. During this downward path traversal, the algorithm spends $O(k_i)$ time per tree level i, whenever chain traversal is needed (line 1(a) and 1(b) in expand( )). Thus, the total catch-up cost in our FS-PRNG scheme is $T_c(t, n)=T_s(t, n)=O(k_0+l_1+k_1+\ldots+l_d+k_d)$.

Concrete Balanced Tree—Consider the case where the chain lengths and star lengths are independent of the level of the tree. That is, $k_0=k_1=\ldots=k_{d-1}=k_d=k$ and $l_1=l_2=\ldots=l_{d-1}=l_d=1$, where $n=k^{d+1}\cdot 1^d$. In this case, the total storage needs is $O(d\cdot 1)$ and the total catch-up cost is $O(d\cdot(k+1))$, where $d=O(\log_{k\cdot 1} n)$ for k, l constant parameters (i.e., independent of n). That is, the used storage is $S_c(n)=S_s(n)=O(1\cdot\log_{k\cdot l} n)=O(\log n)$ and the catch-up cost is $T_c(t, n)=T_s(t, n)=O((k+1)\cdot\log_{k\cdot l} n)=O(\log n)$.

The above concrete (non-standard) balanced FS-PRNG tree is strictly better that the direct equivalent (standard) balanced tree. In the disclosed exemplary FS-PRNG tree, each node v at level j of the tree has weight $$w(j) = \prod_{i=j+1}^{d} (k_i \cdot l_i),$$

i.e., it can derive w(j) leaf-node seeds. These w(j) weight equals the weight w(j+1) times the total number $k_{j+1}\cdot l_{j+1}$ of nodes at level j+1 that are derived by v. In order words, between level j and j+1, the disclosed exemplary FS-PRNG tree has an "expansion" rate with respect to its weights of $k_{j+1}\cdot l_{j+1}$. If $k_{j+1}\cdot l_{j+1}=k\cdot l=b$ is independent of the tree level and the corresponding b-ary balanced tree are considered as the underlying structure for implementing a t-step update, then storage usage of $O(b\cdot\log_b n)$ and catch-up cost of $O(b\cdot\log_b n)$ are obtained. The disclosed exemplary non-standard FS-PRNG tree that uses a combination of chains and star structures performs strictly better that the standard balanced tree: we save a factor of k in terms of storage, and a factor of $k\cdot l/(k+l)$ in terms of catch-up cost.

Extensions and Applications

Calendar-Based Time-Driven FS-PRNG Scheme—The disclosed exemplary FS-PRNG scheme as described above is totally agnostic of whether the FS-PRNG is time-driven or event-driven. For applications that make use of time-driven key updates using a forward-secure pseudorandom number generator, consider the following extension that facilitates the calendar-based systematic (periodic or not) generation of updated keys in a very intuitive, easy-to-understand and thus easy-to-implement and easy-to-operate way.

A generic FS-PRNG scheme can implement key updates according to any calendar-based, periodic or not, schedule as follows. Associate any set of basic time units in a calendar, e.g., years, months, weeks, days, hours, to the levels of the disclosed exemplary FS-PRNG tree, so that the longer-period time units are associated higher in the tree. For instance, in the example above, years correspond to level 0, months to level 1, weeks to level 2, days to level 3 and hours to the lowest level 4. Then the corresponding parameters $k_i$, $l_i$ are determined for each level i in the tree. In one particular instantiation, e.g., in the running example, assume $k_0=10$ (for ten years in total), then $k_1=12$, $k_2=5$, $k_3=7$, $k_4=24$, with $l_1=l_2=l_3=l_4=1$. That is, without using any branching factor, chain lengths can be selected according to the natural relation between the time units. Here, because months do not have an equal number of weeks an upper bound 5 can be used. Then, algorithm Next 1100 can be extended to traverse the FS-PRNG tree as needed according to the current time in the system.

Proactive-Secure FS-PRNG Schemes—To additionally add proactive security to an application using the disclosed exemplary FS-PRNG scheme (such as the above calendar-based time-drive extension), the application uses two FS-PRNG schemes (that employ two distinct but identical FS-PRNG trees), say one Tree A and one Tree B, so that the key used in the system is a combination of the Tree A key produced by the Tree A FS-PRNG and the tree B key produced by the Tree B FS-PRNG scheme. The benefits of this distributed key-derivation process is that if one, either the Tree A or the Tree B, of the two FS-PRNGs is compromised, the security in the system is still preserved, since the attacker cannot reconstruct the combined key.

Furthermore, to offer better protection against compromise of both the Tree A and the Tree B FS-PRNGs, the seed derivation can be can intermixed across the Tree A and Tree B FS-PRNG schemes. There are three ways to intermix seed derivation as explained below.

Figure 14:
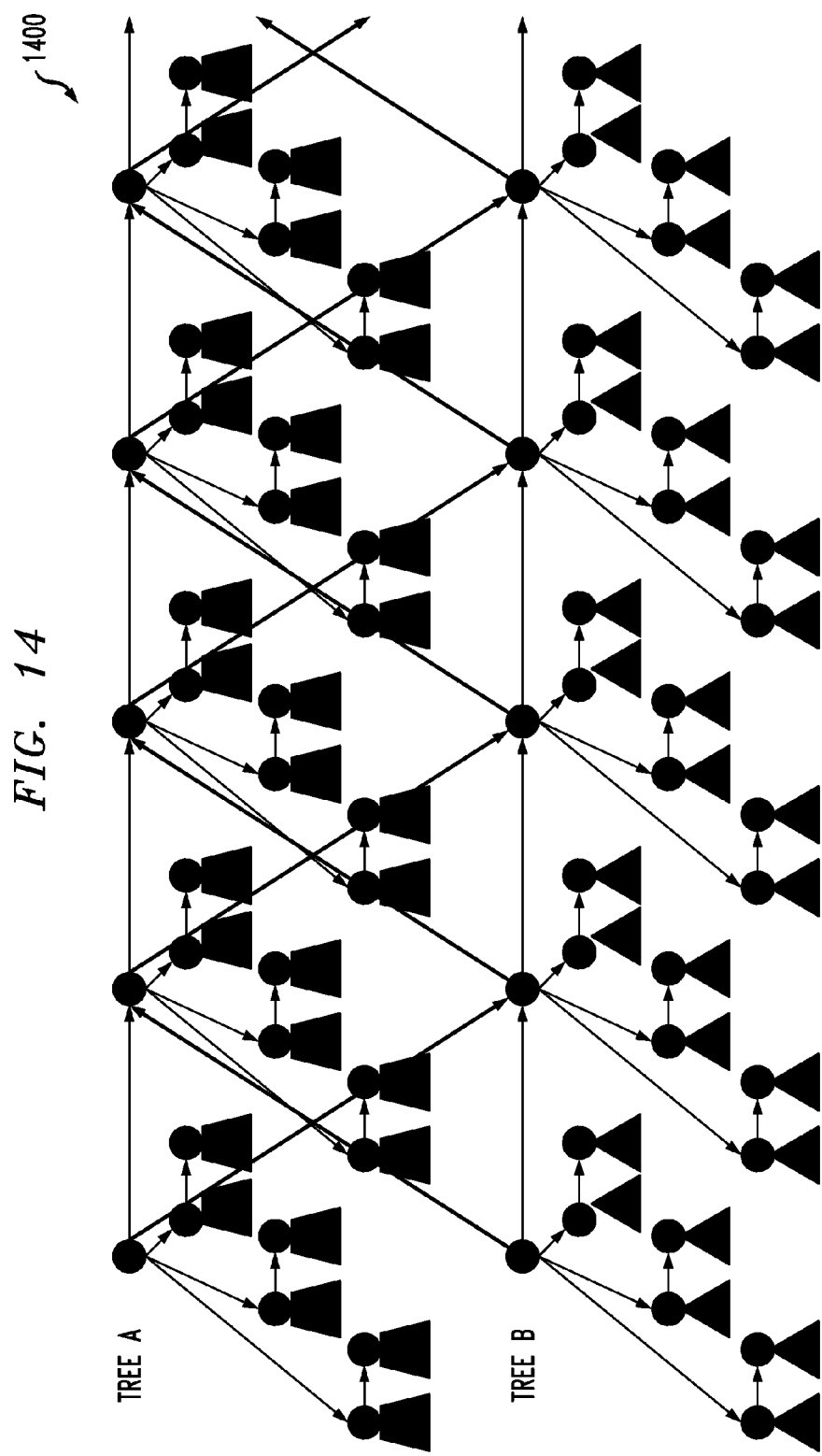
FIG. 14 illustrates the intermixing of two FS-PRNG Trees A and B.
Figure 15:
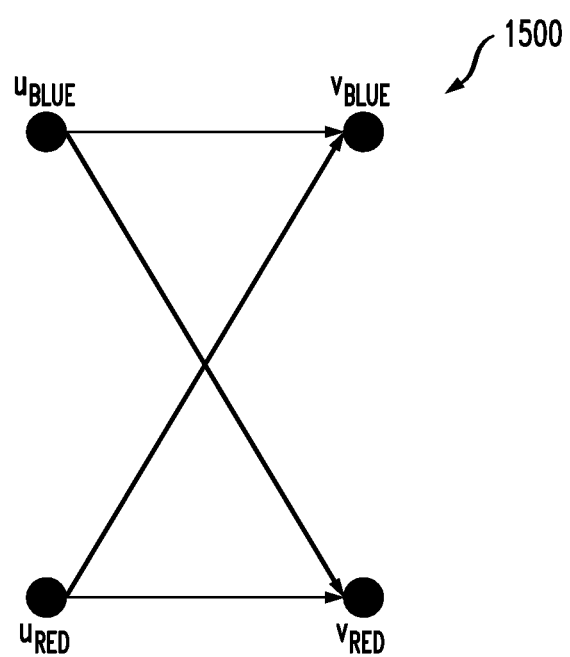
FIG. 15 illustrates the hash computation for the two FS-PRNG Trees A and B of FIG. 14.

FIG. 14 illustrates the intermixing 1400 of two FS-PRNG Trees A and B. There are three variations. FIG. 15 illustrates the hash computation 1500 for the two FS-PRNG Trees A and B of FIG. 14. Tree A is also referred to as Blue in the following discussion and Tree B is also referred to as Red in the following discussion. In particular:

seed($v_{Blue}$)=hash(seed($u_{Blue}$)||hash(seed($u_{Red}$))); and
seed($V_{Red}$)=hash(seed($u_{Red}$)||hash(seed($u_{Blue}$))).

There are three exemplary variations:

(a) Tree B seeds are used as additional inputs for producing Tree A (internal-node or leaf-node) seeds. In particular, for any chain lying at a fixed mixing level i in the Tree A FS-PRNG tree, the seed of a path node $v_{Blue}$, that lies to the right of $u_{Blue}$, is computed as $S(v_{Blue})=f(S(u_{Blue})||h'(S(u_{Red})))$, where $u_{Red}$ is the Tree B node in the Tree B FS-PRNG tree that corresponds to Tree A node $u_{Blue}$ (that is, $u_{Red}$ and $u_{Blue}$ are nodes lying at the same position in their corresponding tree structures) and h' is a one-way function.

The benefits of this unidirectional pollination scheme is that if the Tree A FS-PRNG is compromised before the Tree B one, in particular before at least one time unit that corresponds to the mixing level i (e.g., a week), then the system remains secure: Indeed, after one such time unit has passed, the Tree A state can no longer be consistently and correctly updated by the attacker, as the attacker does not yet know the input coming from the Tree B FS-PRNG scheme.

(b) Analogously, Tree A seeds are used as additional inputs for producing Tree B (internal-node or leaf-node) seeds. In particular, for any chain lying at a fixed mixing level j in the Tree B FS-PRNG tree, the seed of a path node $v_{Red}$, that lies to the right of $u_{Red}$, is computed as $S(V_{Red})=f(S(u_{Red})||h'(S(u_{Blue})))$, where $u_{Blue}$ is the Tree A node in the Tree A FS-PRNG tree that corresponds to Tree B node $u_{Red}$ and h' is a one-way function.

The security offered by this scheme is that symmetric to the one above: if the Tree B FS-PRNG is compromised before the Tree A one, in particular before at least one time unit that corresponds to the mixing level i (e.g., a week), then the system remains secure.

(c) Tree B seeds are used as additional inputs for producing Tree A seeds, and at the same time Tree A seeds are used are additional inputs for producing Tree B seeds. In this particular case, it is required that the mixing tree level is level 0 (or otherwise the efficiency benefits of the FS-PRNG scheme with respect to catch-up costs are dismissed).

The security benefits is this case is the aggregate of the benefits explained above: if one FS-PRNG is compromised before the other, in particular before at least one time unit that corresponds to the mixing level (e.g., a week), then the system remains secure.

Hybrid FS-PRNG Scheme for Forward/Backward On-Demand Traversals—The generic FS-PRNG scheme can be combined with algebraic-form forward-secure FS-PRNG schemes that allow traversing a one-way chain in one step, not only in the forward direction but also in the backward direction. This is generally possible through the use of trapdoor information: If this trapdoor information σ is used in the system by the server (but not the client), then it is possible to achieve more efficiency in the catch-up costs incurred at the server. This can be useful in applications such as secure client-server communication and software-based one-time authentication token (discussed above).

In particular, consider the forward-secure one-way chain construction that is based on the Blum-Blum-Shub $f(x)=x^2$ mod N pseudorandom number generator. Here, N is an RSA modulus and the trapdoor information is the factorization φ(N): Using this information, it is possible to efficiently, i.e., not sequentially, but on demand, compute the seed in any position in the one-way chain. This one-way squaring function has also been used for other applications, e.g., time-lock puzzles and broadcast authentication.

In the disclosed exemplary FS-PRNG scheme, the chains can be implemented in one or more levels of the FS-PRNG tree using this algebraic-form function $f$ (while using the appropriate hash functions g and h so that the domains of produced seeds at each level are compatible with each other). In this way, the server who knows the trapdoor can enjoy some additional performance improvements with respect to the catch-up costs.

Infinite Length FS-PRNG Schemes—The description of the basic FS-PRNG scheme focused on a finite FS-PRNG tree, thus deriving a finite total number n of pseudorandom numbers. The disclosed exemplary FS-PRNG scheme can be extended to generate an infinite number of pseudorandom numbers by employing an FS-PRNG tree that has an infinite-length chain at level 0.

Conclusion

As previously indicated, the above-described embodiments of the invention are presented by way of illustrative example only. Numerous variations and other alternative embodiments may be used, as noted above. The present invention provides new general-purpose techniques for generating forward secure pseudorandom numbers.

Additional details regarding certain conventional cryptographic techniques referred to herein may be found in, e.g., A. J. Menezes et al., Handbook of Applied Cryptography, CRC Press, 1997, which is incorporated by reference herein.

Advantageously, the illustrative embodiments do not require changes to existing communication protocols. It is therefore transparent to both existing applications and communication protocols.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It should again be emphasized that the particular authentication and communication techniques described above are provided by way of illustration, and should not be construed as limiting the present invention to any specific embodiment or group of embodiments. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for generating a forward secure pseudorandom number, comprising:
obtaining a first state $s_i$ corresponding to a current leaf node $v_i$ in a hierarchical tree, wherein said first state $s_i$ comprises a sequence of one or more seeds in said hierarchical tree, wherein said first state $s_i$ is stored in a memory of a hardware device as at least one data structure, wherein said at least one data structure comprises each of said one or more seeds of said first state $s_i$ and corresponding position information identifying a position of said corresponding seed in said hierarchical tree, wherein said current leaf $v_i$ produces a first pseudorandom number $r_{i+1}$, wherein said hierarchical tree comprises at least one chain comprised of a plurality of nodes on a given level of said hierarchical tree;

updating said first state $s_i$ to a second state $s_{i+t}$ corresponding to a second leaf node $v_{i+t}$, by processing said one or more seeds in said at least one data structure in a predefined order based on said corresponding position information to traverse a portion of the hierarchical tree to the second state $s_{i+t}$; and computing a second pseudorandom number $r_{i+t-1}$ corresponding to said second leaf node $v_{i+t}$.

2. The method of claim 1, wherein t is an integer greater than one.

3. The method of claim 1, wherein said updating step does not require generation of all pseudorandom numbers produced by leaf nodes between said current leaf node $v_i$ and said second leaf node $v_{i+t}$.

4. The method of claim 1, wherein said hierarchical tree comprises at least one node having a degree greater than two.

5. The method of claim 1, wherein said first pseudorandom number is a most recent pseudorandom number.

6. The method of claim 1, wherein said second leaf node is a current leaf node.

7. The method of claim 1, wherein said updating step further comprises the step of determining a path $p_{v_i}$ in said tree that connects said first state $v_i$ to a root r of the hierarchical tree.

8. The method of claim 1, wherein said second leaf node $v_{i+t}$ is t positions from said first leaf node $v_i$.

9. The method of claim 1, wherein said updating step further comprises the step of identifying a seed that can produce a target seed at said second leaf $v_{i+t}$.

10. The method of claim 9, further comprising the step of adding a node closer to a tail node of a chain at a given level of said hierarchical tree to said first state $s_i$, wherein said chain includes a node in a path $p_{v_i}$ in said hierarchical tree that connects said first state $v_i$ to a root r.

11. The method of claim 9, further comprising the step of adding a sibling node of a head node at a given level of said hierarchical tree to said first state $s_i$ if said head node is on a path $p_{v_i}$ in said hierarchical tree that connects said first state $v_i$ to a root r and said sibling node has a higher order than said head node.

12. The method of claim 9, wherein said identifying step further comprises the step of deleting one or more seeds that are part of said first state $s_i$ that do not produce said second leaf node $v_{i+t}$.

13. The method of claim 9, wherein said identifying step further comprises the step of expanding one or more seeds that are part of said first state $s_i$ that derive leaf-node seeds that contain a target seed.

14. The method of claim 13, further comprising the step of adding one or more of at least one child node and at least one chain node.

15. The method of claim 1, wherein said current leaf $v_i$ produces a first pseudorandom number $r_{i-1}$ by applying a one-way hash function.

16. The method of claim 1, wherein said second state $s_{i+t}$ is generated from said first state $s_i$ by adding and deleting nodes in said hierarchical tree.

17. The method of claim 1, wherein said computing step further comprises the step of applying a one-way hash function to said second leaf node $v_{i+t}$ to obtain said second pseudorandom number $r_{i+t-1}$.

18. The method of claim 1, wherein said hierarchical tree is defined as a function of one or more parameters that control depth, expansion branching and chain sizes.

19. The method of claim 1, wherein said first leaf node $v_i$ is a leaf node corresponding to a most recently produced pseudorandom number $r_{i-1}$.

20. The method of claim 1, wherein said computed second pseudorandom number $r_{i+t-1}$ is one or more of event-driven and time-driven key updates.

21. The method of claim 20, wherein said computed second pseudorandom number $r_{i+t-1}$ is a time-driven key update and wherein each level of said hierarchical tree corresponds to a basic unit of time and wherein longer-period time units are associated with higher levels of said hierarchical tree.

22. The method of claim 1, wherein the computing step further comprises the step of computing first and second sets of pseudorandom numbers using corresponding first and second hierarchical trees and wherein at least one computed pseudorandom number is a combination of at least one pseudorandom number from said first set and at least one pseudorandom number from said second set.

23. The method of claim 1, further comprising the step of traversing a one-way chain in one step in one or more of a forward direction and a backward direction using trapdoor information.

24. An apparatus for generating a forward secure pseudorandom number, the apparatus comprising:

a memory; and at least one hardware device, coupled to the memory, operative to implement the following steps:

obtaining a first state $s_i$ corresponding to a current leaf node $v_i$ in a hierarchical tree, wherein said first state $s_i$ comprises a sequence of one or more seeds in said hierarchical tree, wherein said first state $s_i$ is stored in the memory of the at least one hardware device as at least one data structure, wherein said at least one data structure comprises each of said one or more seeds of said first state $s_i$ and corresponding position information identifying a position of said corresponding seed in said hierarchical tree, wherein said current leaf $v_i$ produces a first pseudorandom number $r_{i-1}$, wherein said hierarchical tree comprises at least one chain comprised of a plurality of nodes on a given level of said hierarchical tree;

updating said first state $s_i$ to a second state $s_{i+t}$ corresponding to a second leaf node $v_{i+t}$, by processing said one or more seeds in said at least one data structure in a predefined order based on said corresponding position information to traverse a portion of the hierarchical tree to the second state $s_{i+t}$; and computing a second pseudorandom number $r_{i+t-1}$ corresponding to said second leaf node $v_{i+t}$.

25. The apparatus of claim 24, wherein t is an integer greater than one.

26. The apparatus of claim 24, wherein said updating does not require generation of all pseudorandom numbers produced by leaf nodes between said current leaf node $v_i$ and said second leaf node $v_{i+t}$.

27. The apparatus of claim 24, wherein said hierarchical tree comprises at least one node having a degree greater than two.

28. The apparatus of claim 24, wherein said first pseudorandom number is a most recent pseudorandom number.

29. The apparatus of claim 24, wherein said second leaf node is a current leaf node.

30. The apparatus of claim 24, wherein said updating further comprises determining a path $p_{v_i}$ in said tree that connects said first state $v_i$ to a root r of the hierarchical tree.

31. The apparatus of claim 24, wherein said second leaf node $v_{i+t}$ is t positions from said first leaf node $v_i$.

32. The apparatus of claim 24, wherein said updating further comprises identifying a seed that can produce a target seed at said second leaf $v_{i+t}$.

33. The apparatus of claim 32, wherein said at least one hardware device is further configured to add a node closer to a tail node of a chain at a given level of said hierarchical tree to said first state $s_i$, wherein said chain includes a node in a path $p_{v_i}$ in said hierarchical tree that connects said first state $v_i$ to a root r.

34. The apparatus of claim 32, wherein said at least one hardware device is further configured to add a sibling node of a head node at a given level of said hierarchical tree to said first state $s_i$ if said head node is on a path $p_{v_i}$ in said hierarchical tree that connects said first state $v_i$ to a root r and said sibling node has a higher order than said head node.

35. The apparatus of claim 32, wherein said identifying further comprises deleting one or more seeds that are part of said first state $s_i$ that do not produce said second leaf node $v_{i+t}$.

36. The apparatus of claim 32, wherein said identifying further comprises expanding one or more seeds that are part of said first state $s_i$ that derive leaf-node seeds that contain a target seed.

37. The apparatus of claim 36, wherein said at least one hardware device is further configured to add one or more of at least one child node and at least one chain node.

38. The apparatus of claim 24, wherein said second state $s_{i+t}$ is generated from said first state $s_i$ by adding and deleting nodes in said hierarchical tree.

39. The apparatus of claim 24, wherein said current leaf $v_i$ produces a first pseudorandom number $r_{i-1}$ by applying a one-way hash function.

40. The apparatus of claim 24, wherein said computing further comprises applying a one-way hash function to said second leaf node $v_{i+t}$ to obtain said second pseudorandom number $r_{i+t-1}$.

41. The apparatus of claim 24, wherein said hierarchical tree is defined as a function of one or more parameters that control depth, expansion branching and chain sizes.

42. The apparatus of claim 24, wherein said first leaf node $v_i$ is a leaf node corresponding to a most recently produced pseudorandom number $r_{i-1}$.

43. The apparatus of claim 24, wherein said computed second pseudorandom number $r_{i+t-1}$ is one or more of event-driven and time-driven key updates.

44. The apparatus of claim 43, wherein said computed second pseudorandom number $r_{i+t-1}$ is a time-driven key update and wherein each level of said hierarchical tree corresponds to a basic unit of time and wherein longer-period time units are associated with higher levels of said hierarchical tree.

45. The apparatus of claim 24, wherein the computing further comprises computing first and second sets of pseudorandom numbers using corresponding first and second hierarchical trees and wherein at least one computed pseudorandom number is a combination of at least one pseudorandom number from said first set and at least one pseudorandom number from said second set.

46. The apparatus of claim 24, wherein said at least one hardware device is further configured to traverse a one-way chain in one step in one or more of a forward direction and a backward direction using trapdoor information.

* * * * *